United States Patent [19]
Eakins

[11] 3,789,985
[45] Feb. 5, 1974

[54] APPARATUS AND METHOD FOR CONTINUOUS FILTERING
[76] Inventor: William S. Eakins, Glen Cove, N.Y.
[22] Filed: Apr. 24, 1973
[21] Appl. No.: 354,151

Related U.S. Application Data
[60] Division of Ser. No. 160,746, July 8, 1971, which is a continuation-in-part of Ser. No. 845,984, July 30, 1969, Pat. No. 3,615,011, which is a division of Ser. No. 578,361, Sept. 9, 1966, Pat. No. 3,460,674.

[52] U.S. Cl................... 210/77, 210/386, 210/396, 210/400
[51] Int. Cl............................................. B01d 33/32
[58] Field of Search. 210/65, 67, 77, 251, 328, 330, 210/386, 396, 400, 401

[56] References Cited
UNITED STATES PATENTS
2,677,467  5/1954  Giorgini .......................... 210/400 X
2,688,406  9/1954  Holland .......................... 210/401 X Primary Examiner—John Adee
Attorney, Agent, or Firm—John Q. McQuillan

[57] ABSTRACT
A traveling filter comprising a plurality of trays disposed to travel along a path, a plurality of frames adapted to travel along a second path and through a portion of said path mate with the trays to confine material thereon, and a plurality of conduit means adapted to travel along a third path and adapted to be advanced and retracted to establish communication with and discharge liquid from said trays.

34 Claims, 36 Drawing Figures

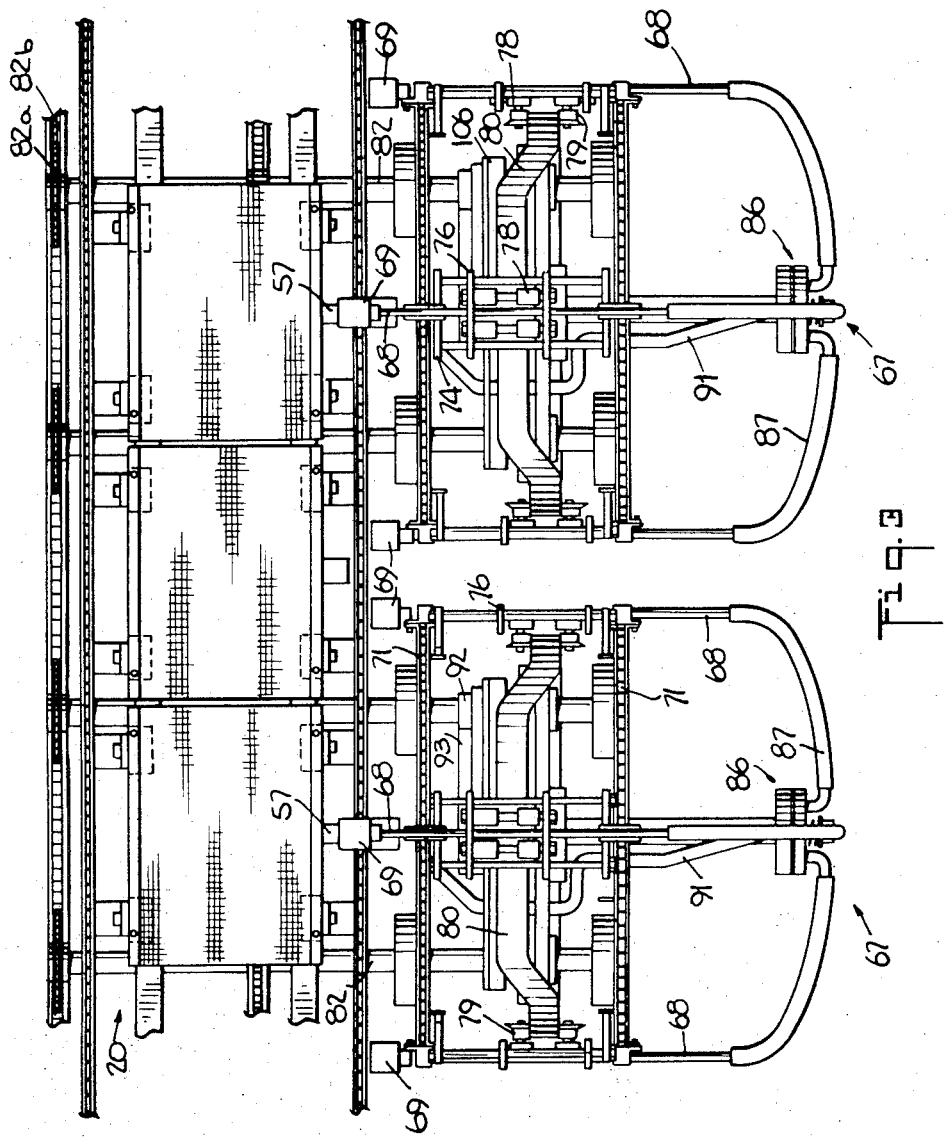

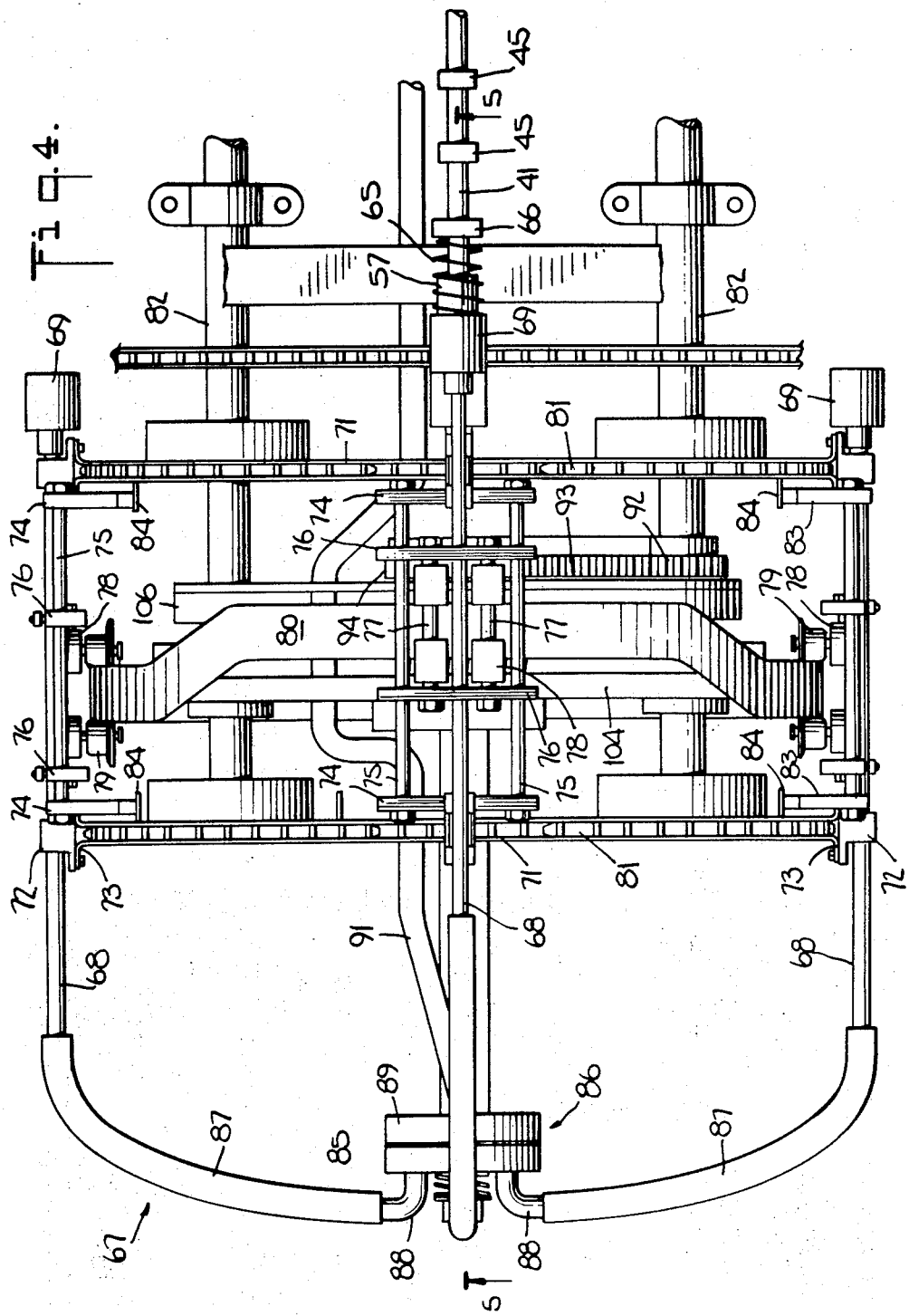

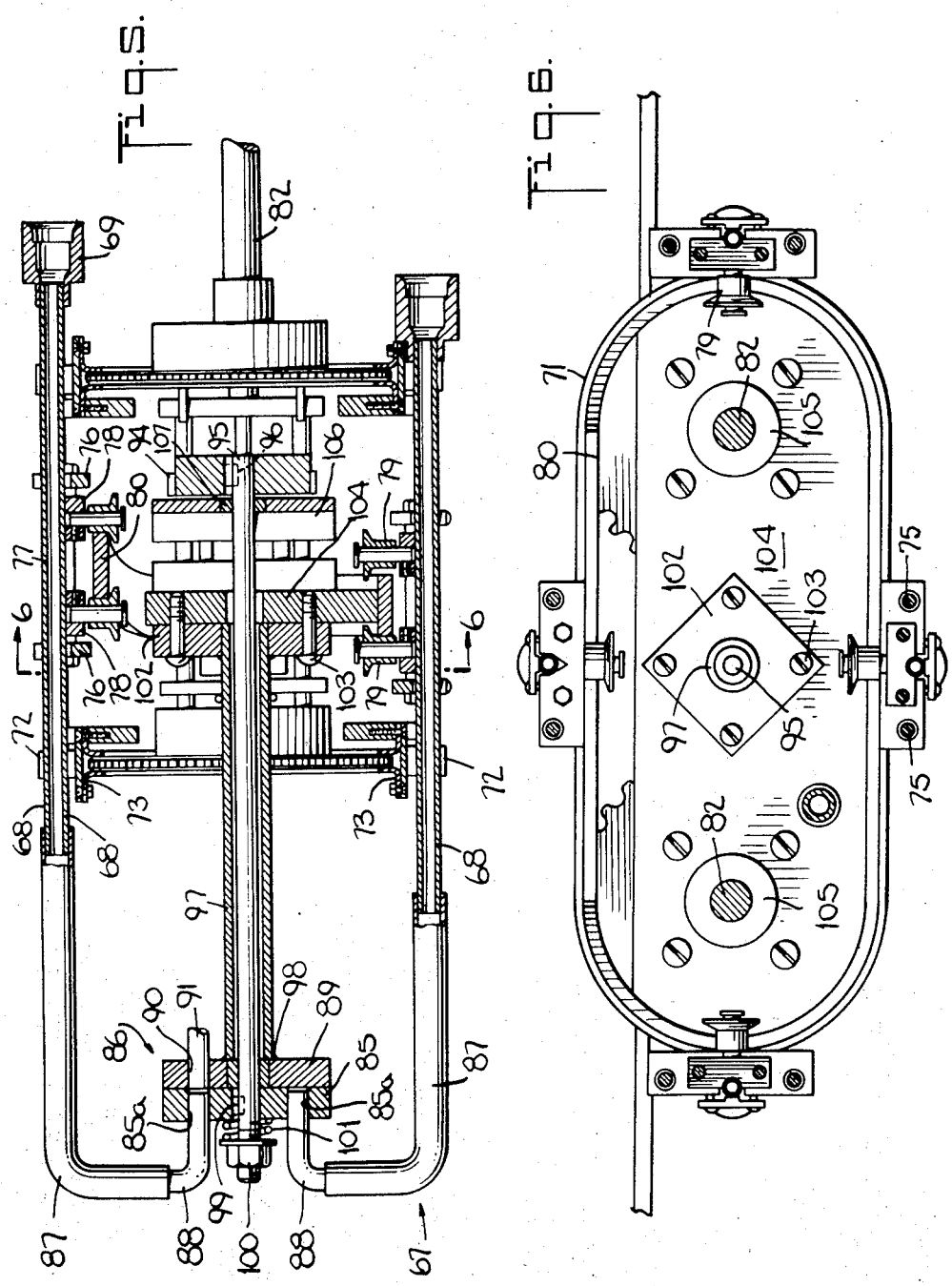

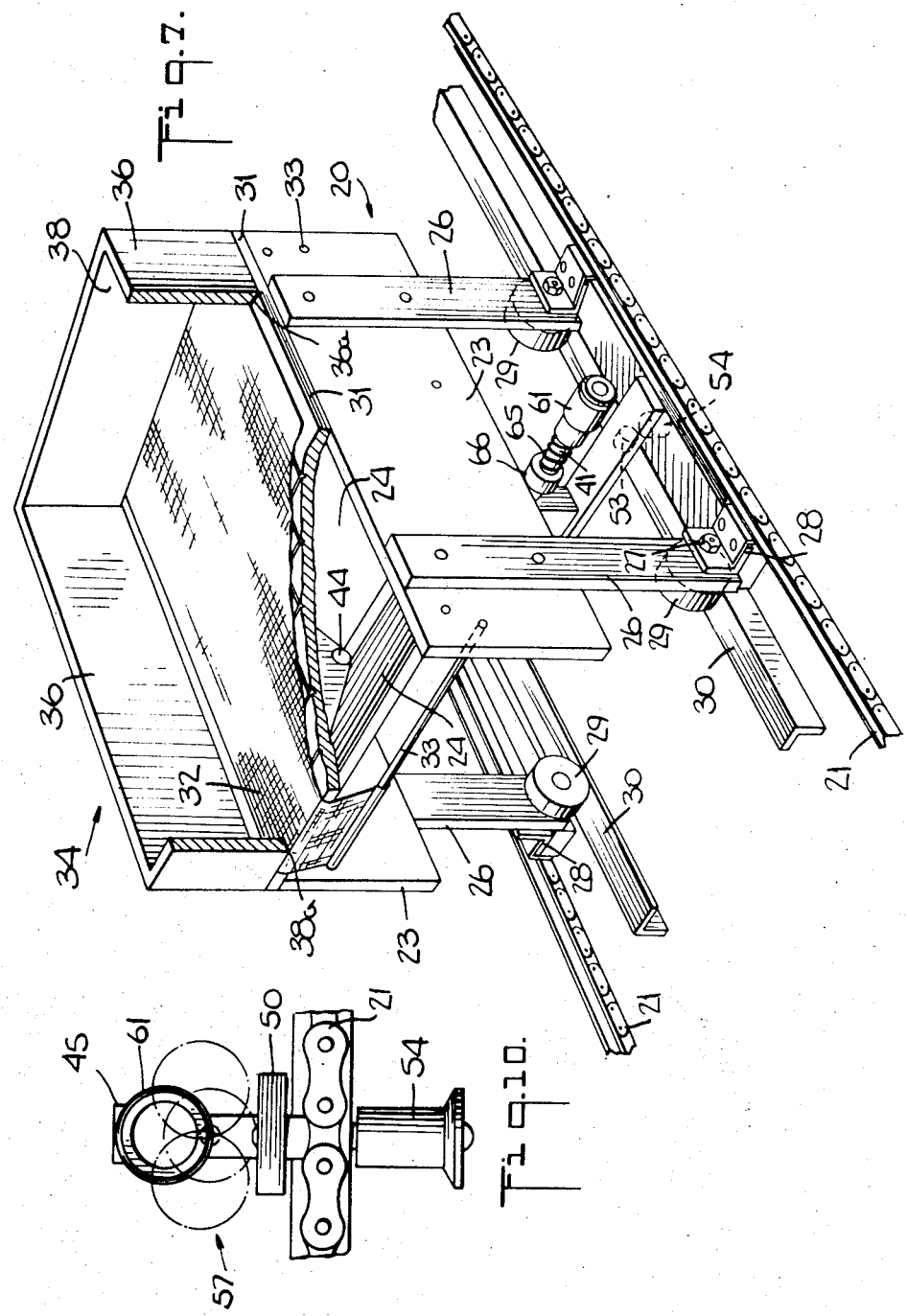

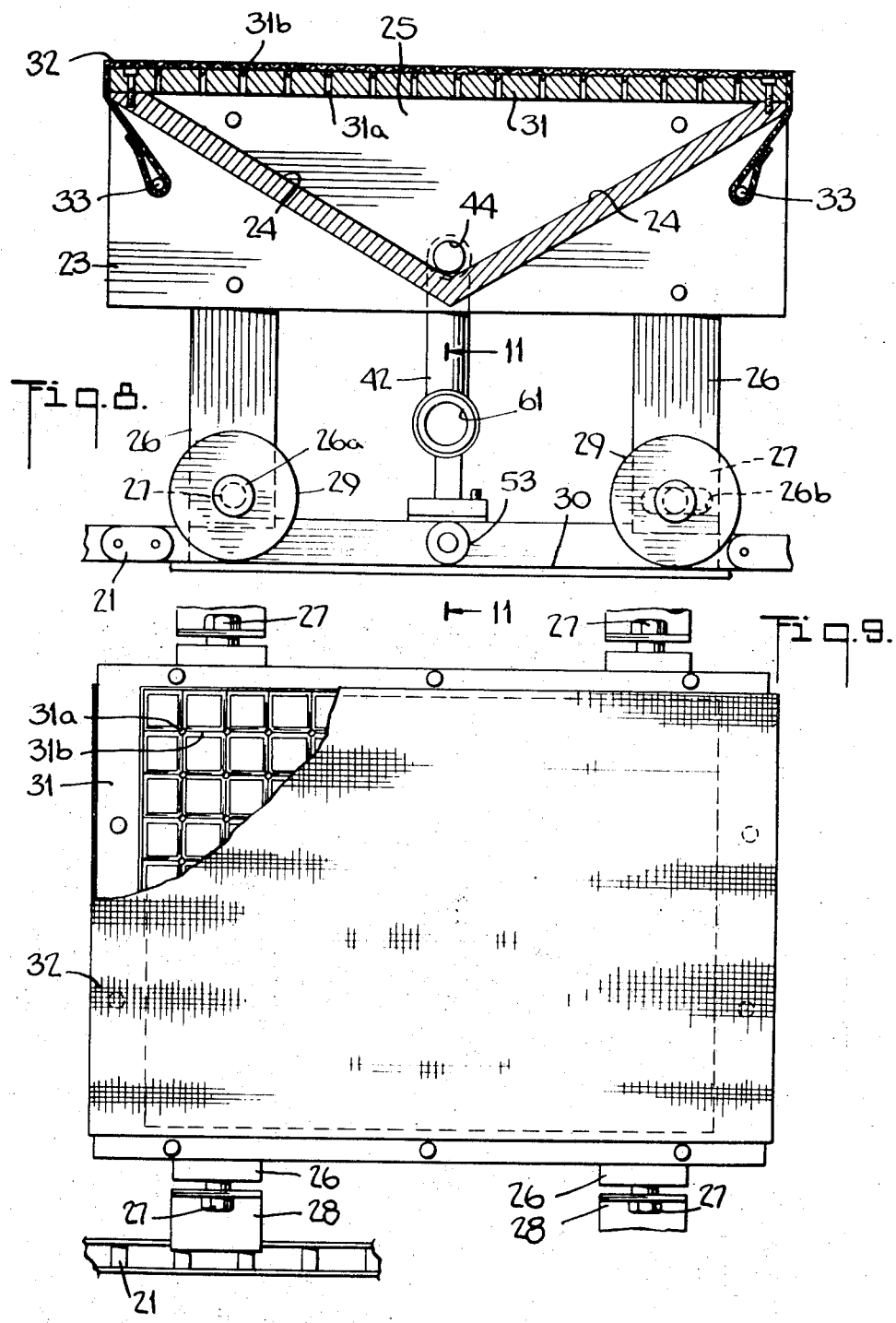

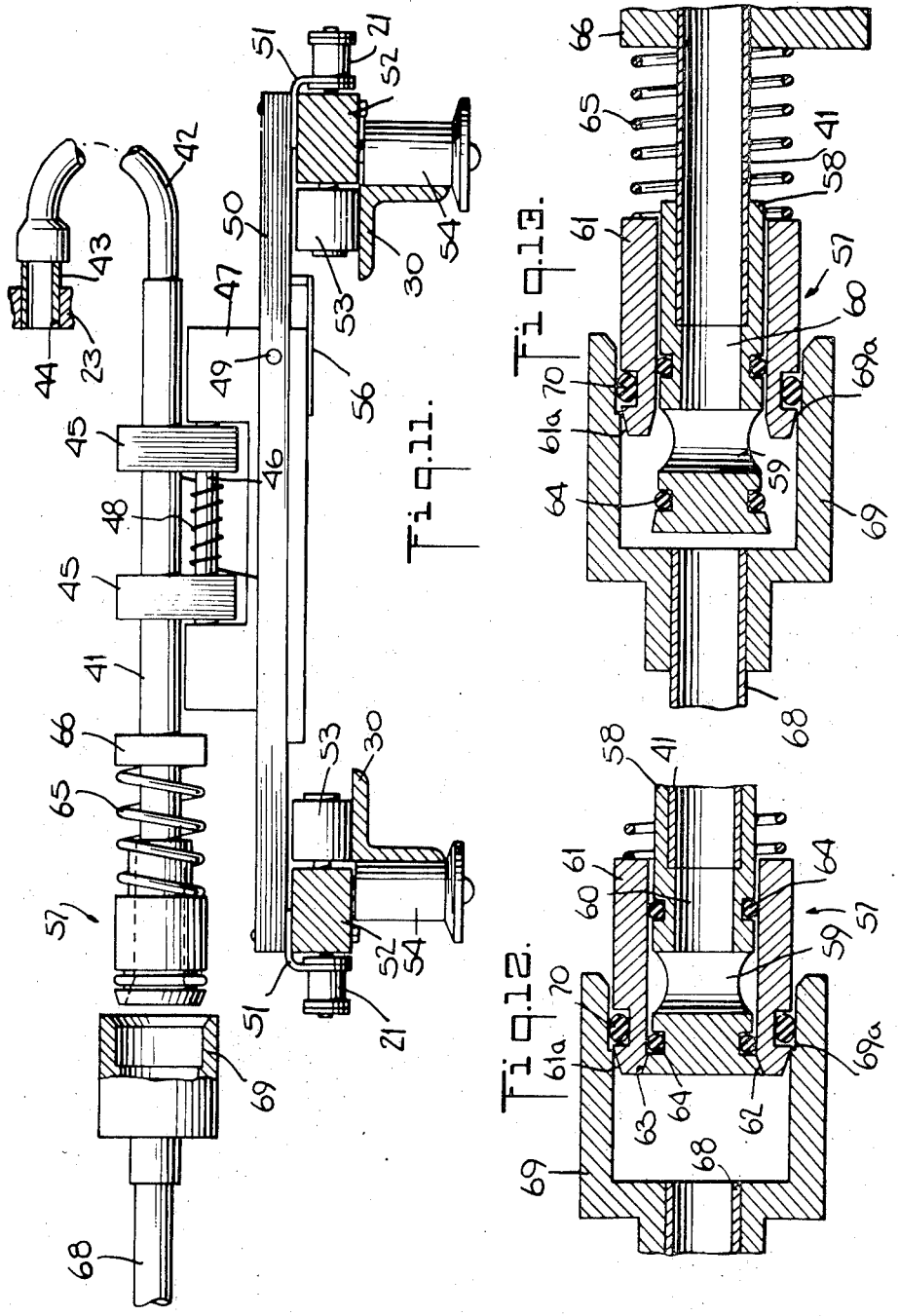

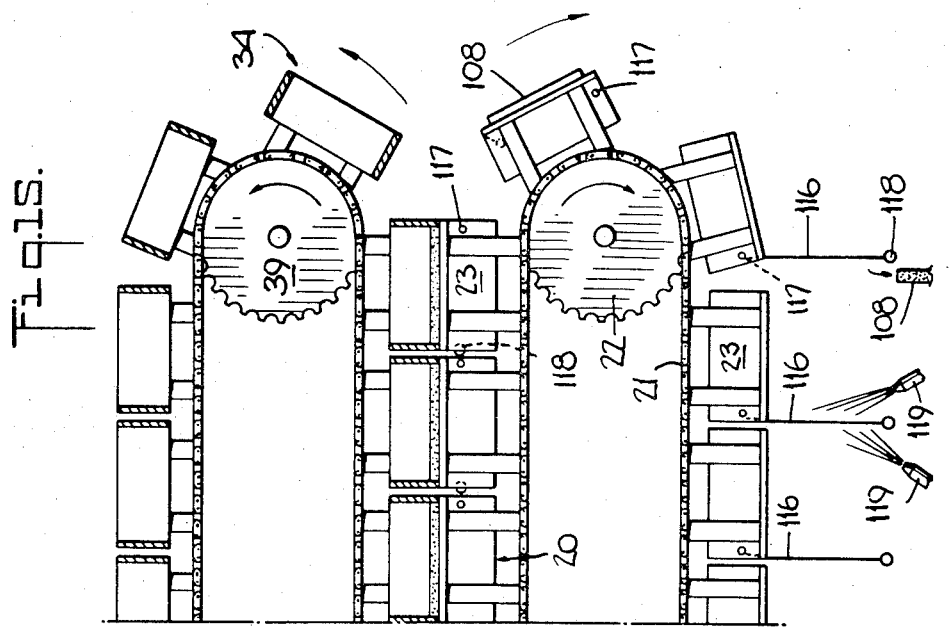
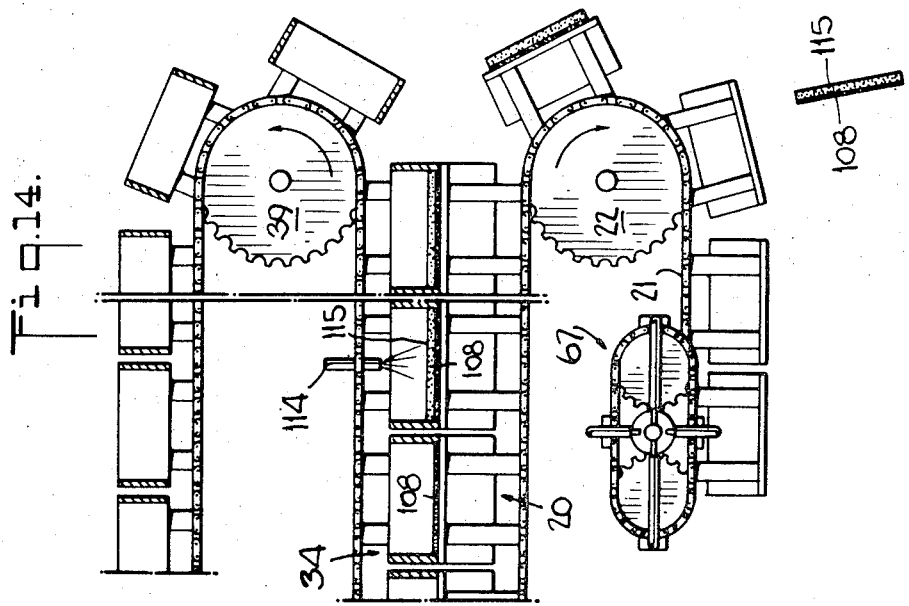

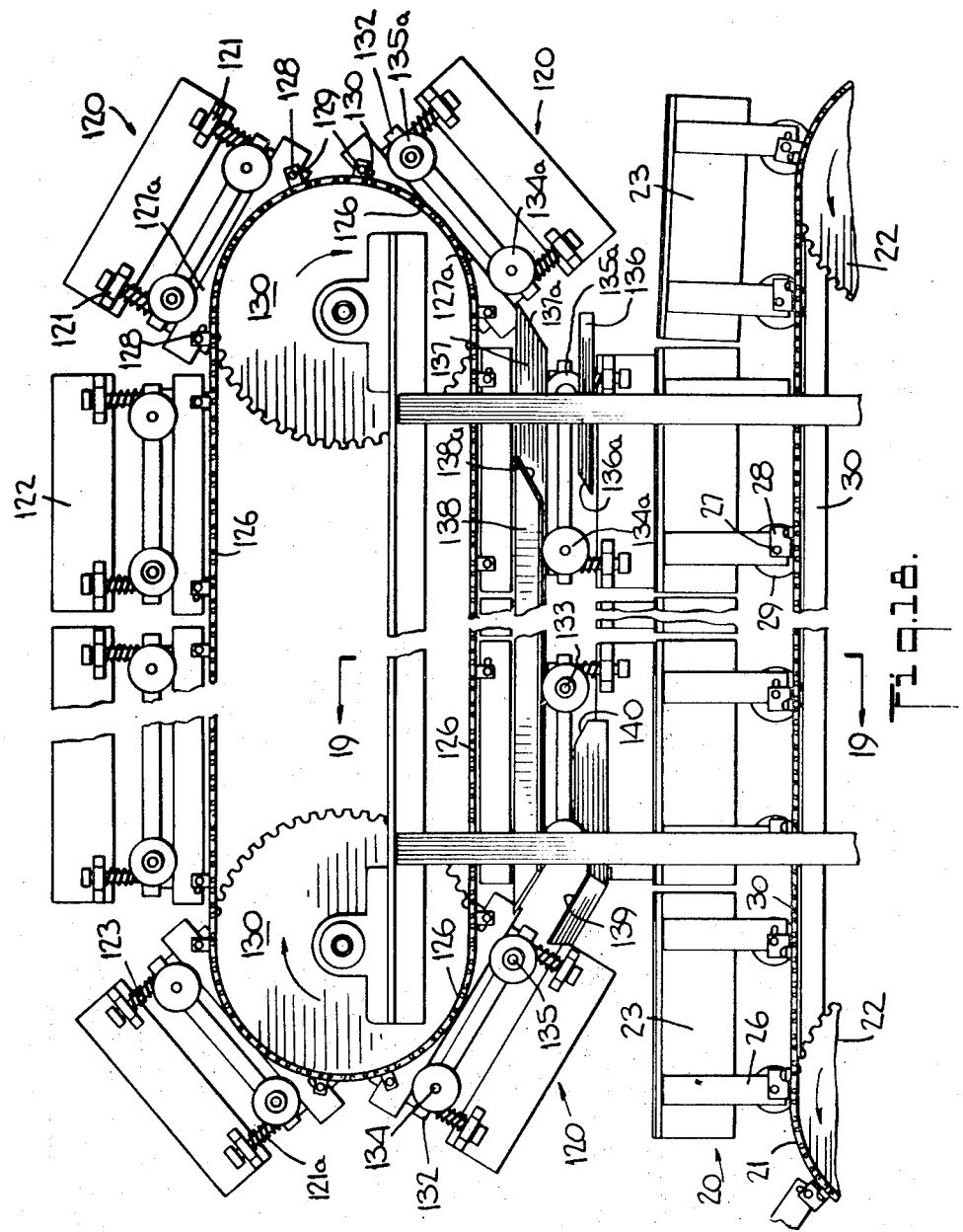

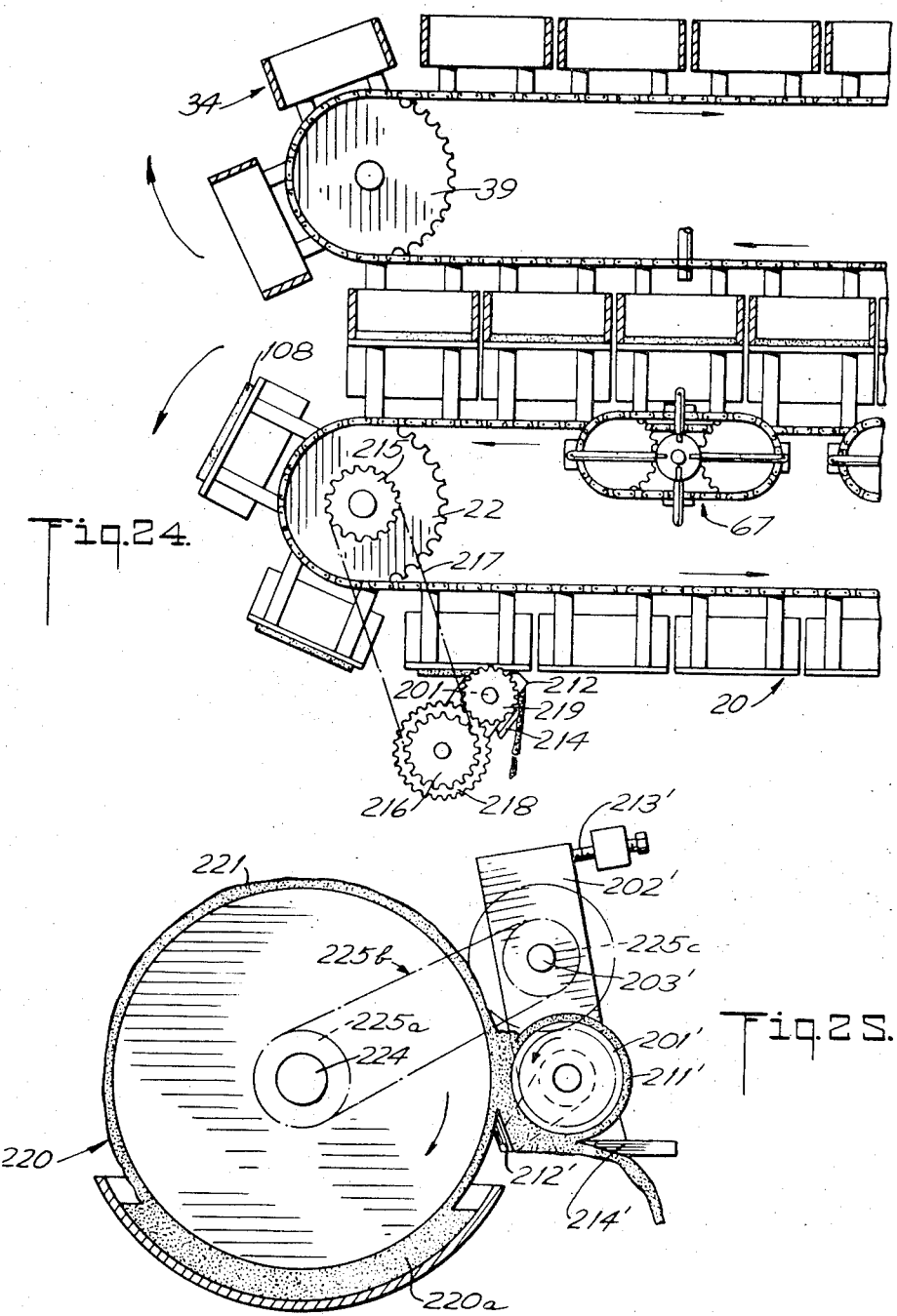

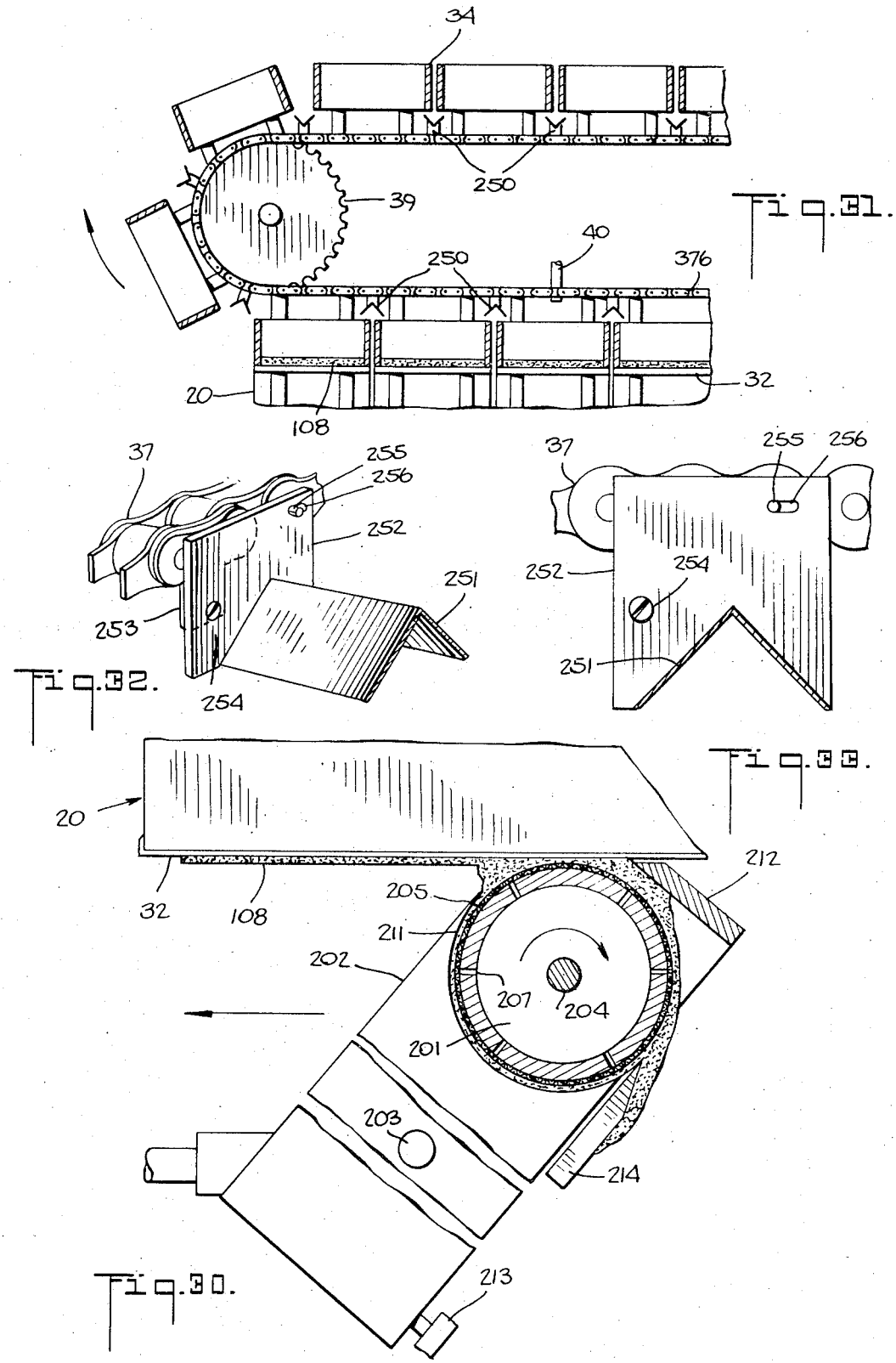

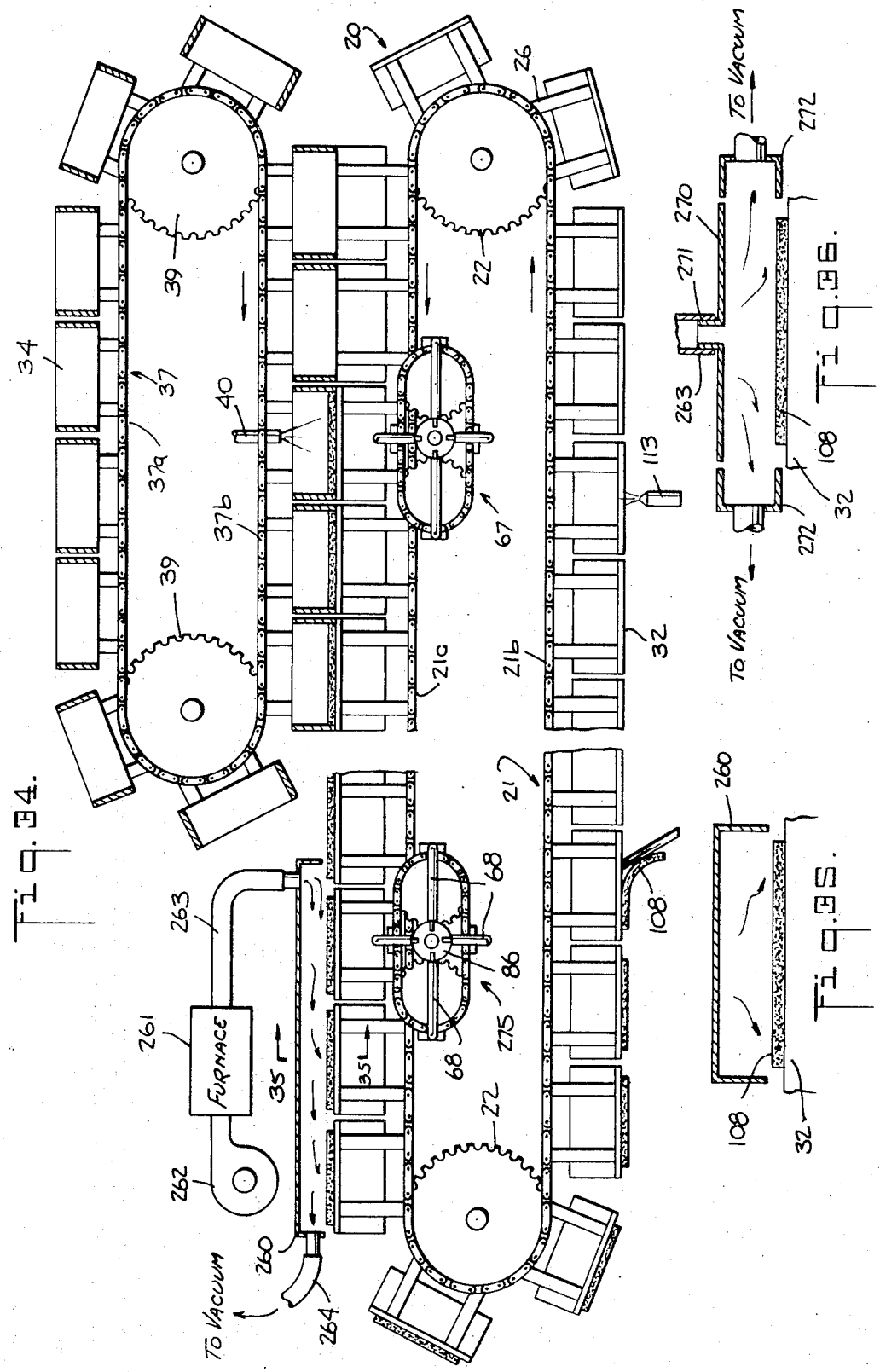

APPARATUS AND METHOD FOR CONTINUOUS FILTERING

This is a division, of application Ser. No. 160,746 filed July 8, 1971 which is a continuation-in-part of my copending application Ser. No. 845,984 filed July 30, 1969, now U.S. Pat. No. 3,615,011 application Ser. No. 845,984 being a division of my then copending application filed Dec. 21, 1966 which issued as U.S. Pat. No. 3,460,674, the last mentioned application being a continuation-in-part of my then co-pending application Ser. No. 578,361 filed Sept. 9, 1966.

This invention relates to continuous filtering and more in particular to a traveling filter in which vacuum is applied to the filter medium as it is conveyed.

In prior art continuous or traveling filters several different difficulties have commonly been encountered. One difficulty is that of applying a flow of fluid, whether it be induced by a pressure or a vacuum source, to the traveling filter in order to treat the filter cake being accumulated upon the filter medium. During and after the delivery of the material to be filtered to the filter medium which can be mounted upon a filter tray, it is generally necessary to apply a vacuum condition in order to draw the liquid portion of the material through the filter medium and thereby separate and build up a filter cake upon the medium. Since filtering apparatus commonly employs an endless belt of appreciable length of a plurality of traveling filter trays and since it is usually necessary to apply a vacuum or pressure condition to the belt or trays over an extensive period of travel, it becomes difficult to provide the necessary equipment for subjecting the belt or each of the filter trays at least through part of their travel throughout the apparatus to a vacuum or pressure condition without involving undue complexity or shortened life for the equipment.

In the prior art, vacuum has been applied to an endless belt or to the separate trays of a traveling filter by providing an elongated suction box over which the belt or trays are advanced. Since it is necessary to form a seal between the bottom portion of the belt or the trays and the suction box, the resulting arrangement is generally subject to excessive leakage and a comparatively high rate of wear between the fixed and stationary portions of the seal.

Another difficulty encountered with traveling filters has been that of obtaining an efficient, reliable and durable arrangement for removing the filter cake after its formation upon the filter medium. Wherever a plurality of continuously moving trays each having a filter medium are employed, difficulty is experienced in removing the filter cake from the tray since the cake tends to cling firmly to the tray and to the filter medium even though the tray is inverted after the formation of the filter cake. Where each tray is provided with side walls of sufficient height to receive and confine a substantial quantity of material to be filtered, the side walls of the tray present a greater area to which the filter cake can cling and adhere during attempts to remove the cake from the tray. Attempts to insure removal of the cake from the tray by the application of reverse blasts or jets of pressure fluid to the filter cake have also resulted in complicated designs which still fail to provide for the simple and reliable removal of the filter cake from the filter medium within the tray.

It is therefore one of the objects of the invention to provide a traveling filter to which a flow of pressured or vacuum fluid can be applied without the need of continuously sliding seals or the like between the filter trays and the source of the flow of pressured or vacuum fluid.

It is another object of the invention to provide a traveling filter in which the duration of the applying of pressure or vacuum to the filter trays can be accurately controlled.

It is still another object of the invention to provide a traveling filter in which pressure or vacuum can be applied in a controlled manner with respect to each of the filter trays independently of one another.

It is an additional object of the invention to provide a traveling filter in which fluid can be applied with respect to each tray individually even though the filter travels over an appreciable distance.

It is a further object of the invention to provide a traveling filter in which the construction of the trays is conditioned to facilitate the release and the removal of the filter cake.

It is still a further object of the invention to provide a traveling filter in which the material to be filtered and the resulting filter cake is confined to the filter medium only during a portion of the travel of the tray.

It is another object of the invention to remove filter cakes from a traveling filter in a clean efficient manner.

It is another object of the invention to intermittently feed the trays of a traveling filter in sequential manner.

It is also an object of the invention to provide a traveling filter in which the filter medium of each of the trays can be operated to facilitate the removal of the filter cake therefrom.

In one of the embodiments of the invention the traveling filter includes a plurality of tray members each having a filter medium which is adapted to receive material to be filtered. Each of the plurality of tray members has a passage for passing a flow of fluid with respect to the tray member. Means are provided for conveying the plurality of tray members along a predetermined path. At least one conduit adapted to be connected to a device for producing a flow of fluid is provided. In addition, means are provided for driving the conduit along an additional path adjacent to at least a portion of the predetermined path of the tray members. Means are also provided for successively advancing and retracting the conduit with respect to its additional path as the conduit is driven in order successively to engage and disengage the conduit with respect to the passage of the tray member as the tray member is conveyed.

An advantage of this arrangement is that the operation of the conduit can be conveniently established at various locations along the predetermined path of the tray members since the conduit is driven adjacent to the path of the tray members and since the conduit is advanced and retracted with respect to its own path. An additional advantage is that it enables a flow of fluid to be controlled with respect to each individual tray member independently of the remaining tray members. Another advantage is that the advancing and retracting of the conduit enables the passage of the tray member to be engaged and disengaged at various locations along its predetermined path of travel without interfering with the conveying of the tray member.

In another embodiment of the invention the tray members are provided with a cavity with which the passage is in communication and over which the filter medium is disposed. This construction enables the conduit to establish a flow of fluid with respect to the filter medium by way of the cavity.

In still another embodiment of the invention the filter medium of each of the plurality of tray members extends in a substantially horizontal plane throughout at least a portion of the predetermined path of the tray members in order to assist the accumulation of a filter cake upon the filter medium.

In an additional embodiment of the invention the conduit comprises a tubular member which is adapted to successively engage and disengage the passage of the tray member in order to establish a flow of fluid with respect to the tray member.

In a further embodiment of the invention the traveling filter comprises a plurality of tray members each having a filter medium and means for conveying the tray members along a predetermined path. The filter further includes a plurality of frame members each having an opening adapted to mate in a facing relationship with the surface area of the filter medium. Means are provided for moving the plurality of frame members along another path extending at least in part adjacent to the predetermined path of the tray members in order successively to place and remove the opening of each of a portion of the plurality of frame members with respect to a condition of registry and substantial engagement with a different one of the tray members of a corresponding portion of the plurality of tray members.

An advantage of this arrangement is that the frame members are adapted to confine the material to be filtered upon the filter medium adjacent thereto. Subsequently, upon removal of the frame members from in registry and substantial engagement with the tray members, the removal of the filter cakes from the filter mediums is facilitated and made more positive.

In still a further embodiment of the invention the conveying means for the plurality of tray members and the plurality of frame members each have upper and lower reaches with at least a portion of the lower reach of the frame members overlying and sufficiently adjacent to the upper reach of the tray members in order to enable the frame members to be placed in registry and substantial engagement with the tray members.

In another embodiment of the invention the traveling filter includes means for delivering the material to be filtered through the openings of the frame members as the frame members are moved along the lower reach of their conveying means.

In another embodiment, a hopper is positioned within the reach of the conveying means to be filled with feed material and intermittently pivoted in response to the presence of a tray underneath to dump its contents into successive trays.

In a still further embodiment of the invention, the traveling filter has a take-up roller mounted adjacent a conveying means and a pair of scrapper blades. The take-up roller is provided with ports in the surface which communicate with a vacuum source to hold the cake material and the blades are arranged so that one scrapes a filter cake onto the roller and the other scrapes an upper layer of cake material from the roller at an advanced position.

Various other objects and advantages of the present invention will be readily apparent from the following detailed description when considered in connection with the accompanying drawings in which:

FIG. 3 is a fragmentary plan view of the conveyor for the tray members showing the conduits and the means for driving the conduits along an additional path adjacent to a portion of the predetermined path of the conveyor of the tray members;

FIG. 4 is a plan view of a single one of the assemblies of conduits with the means for successively advancing and retracting the conduits as they are driven with respect to the conveyor for the tray members;

FIG. 5 is a vertical section view taken along the line 5—5 in FIG. 4 and showing the control valve arrangement for the flow of fluid through the conduits;

FIG. 6 is a vertical section view taken along the line 6—6 of FIG. 5 and showing the means for driving the conduits along an additional path adjacent to the predetermined path of the tray members;

FIG. 7 is a perspective view of one of the plurality of tray members and one of the plurality of frame members in registry and substantially engaged with the tray member;

FIG. 8 is a vertical section view taken along a plane extending parallel to the line of travel of the tray member and showing the cavity, the filter medium and the passage of the tray member;

FIG. 9 is a plan view of one of the tray members showing the filter medium overlying the plate of the tray member;

FIG. 10 is an elevational view of the end portion of a passage connected to a tray member showing the alternate titled portions which the passage can assume with respect to its support;

FIG. 11 is a vertical section view taken along the line 11—11 in FIG. 8 and showing the passage and the valve connected thereto for a tray member in alignment with the conduit;

FIG. 12 is a fragmentary vertical section view showing the opening of a conduit advancing into engagement with the valve of the passage leading to the tray member;

FIG. 13 is a fragmentary vertical section view showing the opening of the conduit fully engaged with the open valve of the passage leading to the tray member;

FIG. 14 is a fragmentary vertical section view of the conveyors for the frame members and the tray members and showing the filter cake being released from the tray member after removal of the frame member;

FIG. 15 is a fragmentary vertical section view showing a detachable filter medium for facilitating the removal of the filter cake;

FIG. 16 is a fragmentary vertical section view showing means for assisting in the removal of the filter cake from the detachable filter medium;

FIG. 17 is a fragmentary vertical section view showing a roller and a scrapper blade for removing the filter cake from the filter medium.

FIG. 18 is an elevational view showing an arrangement for camming the tops into engagement with the trays as the tops and trays advance.

FIG. 24 is a view of the drive for the modified structure of FIG. 22;

FIG. 25 is a view of the modified structure for removing the filter cake from a filter apparatus of different construction;

FIG. 30 is a cross section view of a structure for removing the filter cake from a stationary filter medium;

FIG. 31 is a fragmentary elevational view of the traveling filter of FIG. 1 showing additional means for directing the continuous flow of material to be filtered into one of the adjacent frame members to prevent the material from passing between the adjacent frame members and trays;

FIG. 32 is a perspective view of a portion of the material directing means of FIG. 31 showing the method of mounting the same to the conveyor chains; and FIG. 33 is a cross section view of the material directing means of FIG. 31;

FIG. 34 is an elevational view of another embodiment of the traveling filter of the invention showing the upper and lower reaches of the conveyor of the tray members extended beyond the conveyor of the frame members to permit the filter cakes formed on the filter mediums of the tray members to be dried by the application of heat thereto by means of a hood assembly provided to direct a flow of hot gas across the filter cakes as they pass along the extended portion of the tray member conveyor;

FIG. 35 is a cross sectional view of the hood assembly of FIG. 34;

FIG. 36 is a cross sectional view of another embodiment of a hood assembly similar to the embodiment of the hood assembly of FIGS. 34 and 35.

Figure 1:
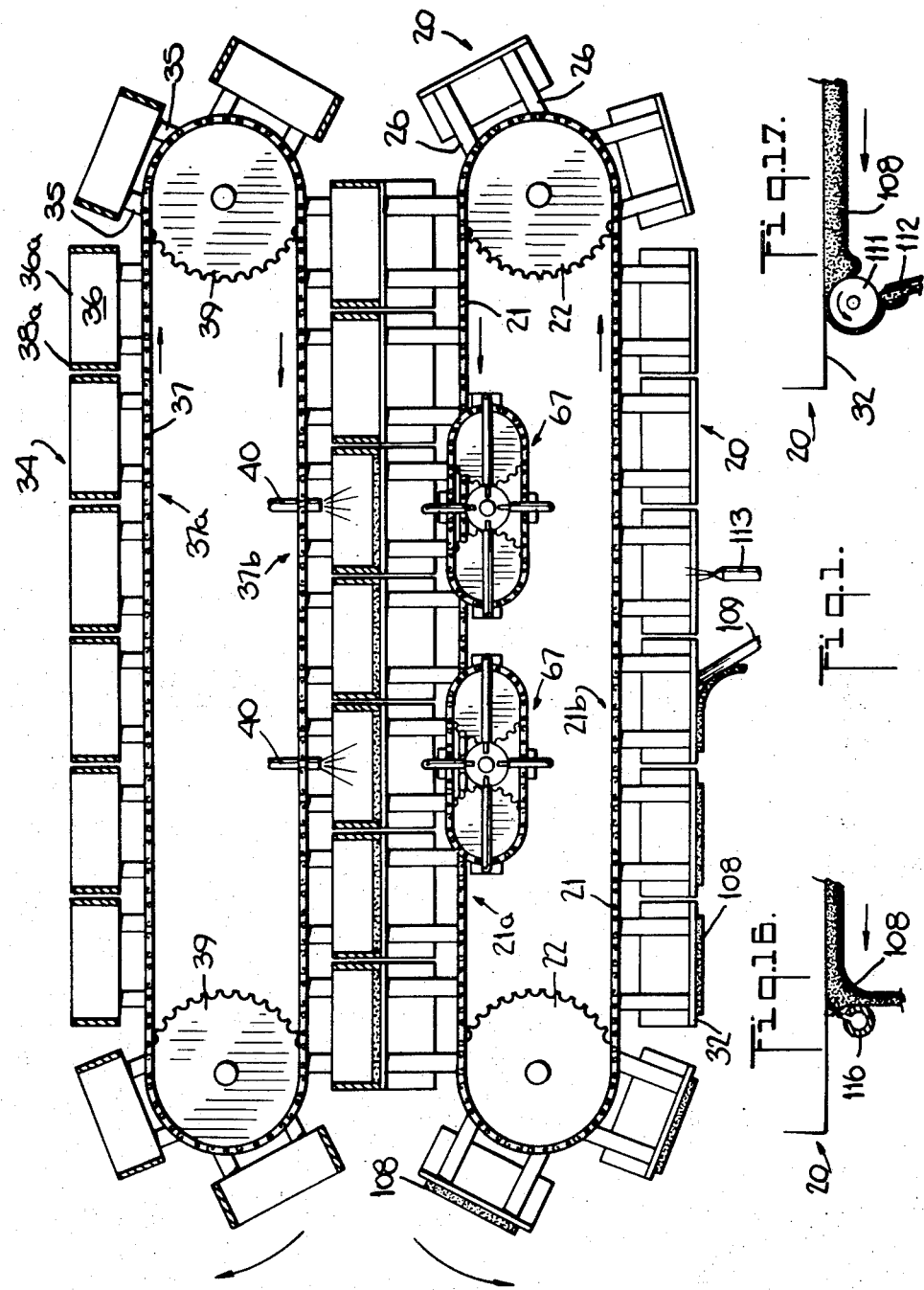
FIG. 1 is an elevational view of the traveling filter of the invention showing the lower reach of the conveyor of the frame members overlying and in substantial engagement with the upper reach of the conveyor of the tray members with means for successively advancing and retracting the conduits disposed adjacent to the upper reach of the conveyor for the tray members.
Figure 2:
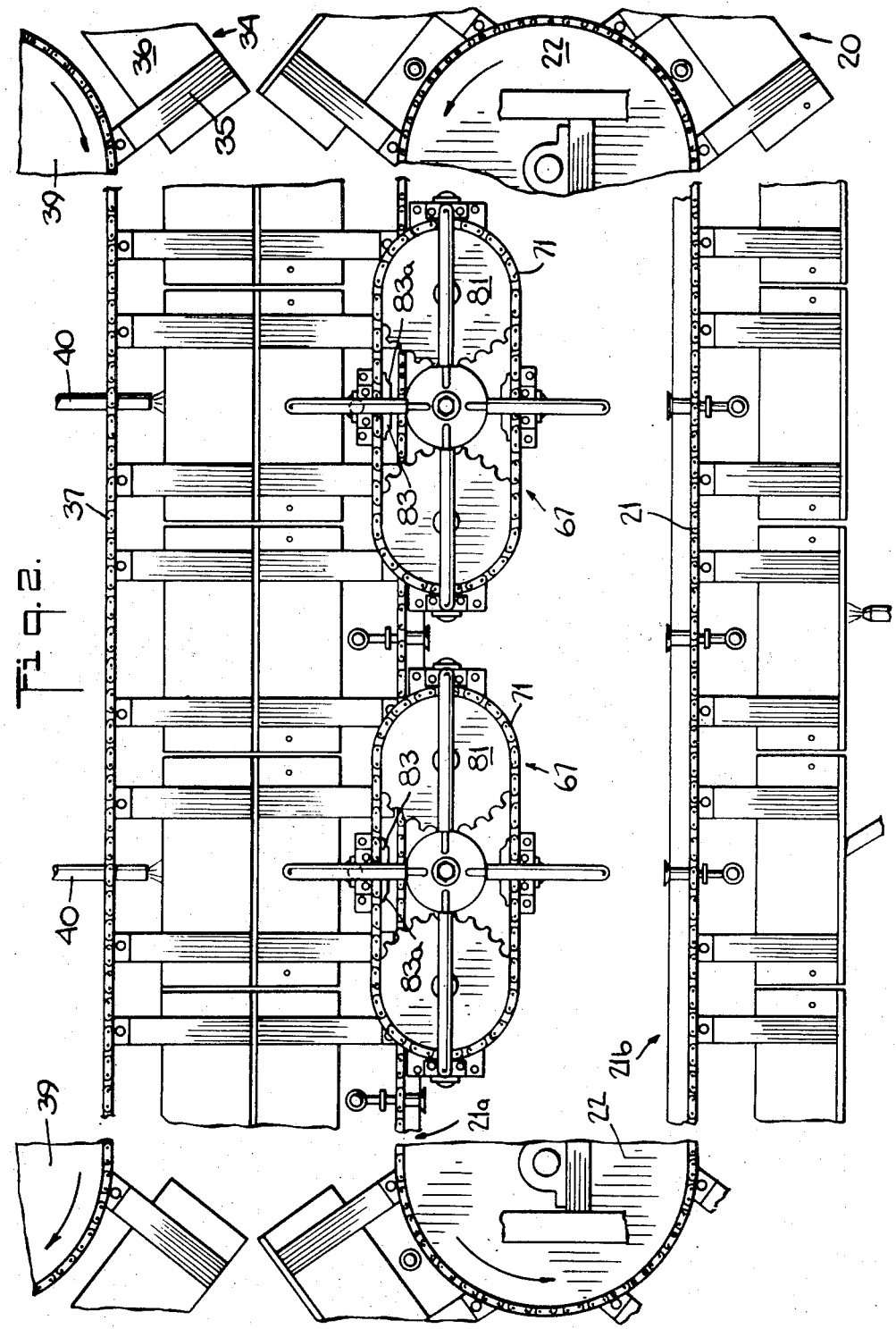
FIG. 2 is a fragmentary elevational view of the traveling filer showing the means for driving the conduits along an additional path adjacent to a portion of the predetermined path of the tray members.

The traveling filter of the invention includes a plurality of tray members or trays 20 connected to and driven by conveying means or endless conveying chains 21 along a predetermined path which includes upper reach 21a and lower reach 21b (FIGS. 1 and 2). Chains 21 are driven in the direction shown by the arrows in FIGS. 1 and 2 by at least one of sprockets 22. The upper and lower reaches of chains 21 extend in a substantially horizontal direction.

Trays 20 include side walls 23 and bottom walls 24 which form cavity 25 (FIGS. 7, 8 and 9). The trays are supported with respect to chains 21 by means of legs 26 attached to side walls 23. One pair of legs 26 are provided with openings 26a through which bolts 27 extend. Bolts 27 which are mounted in brackets 28 and engage wheels 29 serve as axles for supporting legs 26 with respect to the wheels and thereby with respect to rails 30. The attachment of brackets 28 to chains 21 enables the chains to drive or convey the trays. The remaining pair of legs 26 are similarly mounted with the exception that bolt 27 passes through slot 26b which extends in a horizontal direction. The clearance of bolt 27 in slot 26b prevents legs 26 from attempting to restrain the chains whenever the trays are carried by the chains along a circular path extending from one reach to the other of the conveyor.

Cavity 25 of tray 20 is covered by plate 31 containing a plurality of openings 31a which extend from serrations or grooves 31b arranged in a grid-like pattern across the plate. Filter medium 32 overlies plate 31 and is supported by the plate with respect to cavity 25. The filter medium which can comprise cloth, wire cloth, porous material, etc., is stretched in a taut manner across plate 31 by means of rods 33 mounted upon side walls 23.

Along upper reach 21a wheels 29 support the weight of the tray upon rails 30. In the inverted position of tray 20 as it travels along lower reach 21b of the conveyor, the tray hangs by means of legs 26 and brackets 28 from chains 21. Along the upper reach, filter medium 32 extends in a substantially horizontal plane in order that it may receive a substantially uniform layer of material to be filtered.

Frame members or tops 34 are supported by legs 35 attached to side walls 36 (FIGS. 1, 2 and 7). The support of legs 36 and their engagement with the moving means or conveyor chains 37 can be similar to that of legs 26 of the trays with respect to chains 21. End walls 38 of tops 34 form an opening which is adapted to mate in a facing relationship with the surface area of filter medium 32.

Chains 37 include upper reaches 37a and lower reaches 37b which extend about sprockets 39 and are driven by at least one of them. The assembly of conveyor chains 37 with tops 34 is positioned so that edges 36a and 38a of the walls of the top can be placed in substantial engagement with filter medium 32 along the lower reach of the conveyor for the tops and the upper reach of the conveyor for the trays. With this arrangement, the tops can confine the material to be filtered which is directed into the tops by delivering means such as pipe 40 (FIGS. 1 and 2). As shown in FIG. 7 edges 36a of the side walls can bear directly upon plate 31 while edges 38a of the end walls bear upon filter medium 32. The engagement between the tops and the trays is adjusted to prevent leakage between the tops and the trays as they travel mated together. Edges 36a and 38a can be covered with suitable resilient material such as elastomeric material in order to form a seal between the tops and the trays.

Each of the plurality of trays is provided with structure forming a passage for passing a flow of fluid with respect to the tray. The passage includes pipe 41 connected by hose 42 to fitting 43 mounted in opening 44 of side walls 23 (FIGS. 8 and 11). Pipe 41 is secured to arms 45 which are in turn attached to pin 46. Pin 46 is pivotally mounted in support 47 and the engagement of pin 46 with support 47 is conditioned to permit arms 45 to swing toward each side of the vertical extending from pin 46. For example, the pins can be conditioned to limit the swing of the arms to each side of the vertical to an arc approximately in the range of about 45° to 90° (FIG. 10). Torsion spring 48 which engages support 47 and pipe 41 biases arms 45 and thereby pipe 41 in a position tilted from the vertical in a direction opposite to the direction of travel of pipe 41.

Support 47 is pivotally mounted about a horizontal axis by shaft 49 which is supported by carrier 50. The carrier is attached at each of its free ends by brackets 51 to chains 21. Carrier 50 is mounted upon blocks 52 at each of the free ends and in turn blocks 52 are supported by rollers 53 upon the horizontal surfaces of rails 30. In order to restrain carrier 50 from lateral movement, there is provided rollers 54 pivotally mounted upon blocks 52 and engaging the vertical surfaces of rails 30.

In order to pivot support 47 about shaft 49 and bias the support in a downward position, flat spring 56 mounted upon carrier 50 is attached to support 47.

The end of pipe 41 opposite to hose 42 is provided with valve assembly 57 (FIGS. 11-13). The valve assembly includes sppol 58 attached to pipe 41. Spool 58 includes transverse port 59 which communicates with passage 60 connected to the interior of pipe 41. Sleeve 61 surrounds spool 58 and includes tapered seat 62 which is adapted to engage tapered face 63 of the spool. Port 59 is sealed at the opposite sides thereof with respect to sleeve 61 by means of seal rings 64. Spring 65 which engages collar 66 affixed to pipe 41 urges sleeve to close seat 62 against face 63 in the normal condition.

Transfer pipe assemblies 67 include pipe 68 which serves as a conduit adapted to be connection to a device for producing a flow of fluid there through (FIGS. 2-6). Pipes 68 are provided with sockets 69 at one end thereof. In order to form a connection between pipe 68 and pipe 41 which is connected to the tray, it is necessary to convey pipe 41 in the direction of the trays and to advance socket 69 into engagement with sleeve 61 as shown in FIGS. 12 and 13. Advancing socket 69 toward valve assembly 57 results in shoulder 69a intersecting tapered surface 61a of sleeve 61. Once the tapered surface is engaged by the shoulder of socket 69, further movement of the socket toward the valve assembly causes sleeve 61 to be moved from engagement with face 63 of spool 58 with the result that transfer port 59 becomes connected to the interior of socket 69. Seal ring 70 maintains a fluid-tight connection between the socket and the sleeve. Since socket 69 opens sleeve 61 by urging it to compress spring 65, upon removal of the socket, that is upon movement of the socket away from the valve assembly, spring 65 urges sleeve 61 to close seat 62 against face 63.

Each of pipes 68 is mounted with respect to chains 71 by means of guides 72 and brackets 73 attached to the supports. Supports 72 have circular openings for forming a sliding engagement with pipes 68. Thus the guides and brackets form a sliding coupling of pipes 68 to chains 71. Plates 74 are connected to one another by tie rods 75. The tie rods provide ways upon which plates 76 are mounted in a sliding relationship. Bolts 77 which extend through plates 76 support mounts 78 adjacent thereto. Each of the mounts pivotally support rollers 79 which are adapted to engage the edges of track 80.

Chains 71 are driven by sprockets 81 which are attached to shafts 82. In turn shafts 82 are driven by sprockets 82a and chains 82b which are connected to the main drive (not shown) for the traveling filter. The drive to sprockets 81 is selected to operate chains 71 at a linear speed which corresponds to the linear speed of tray conveyor chains 21. With this arrangement it can be seen that the drive transmitted by chains 77 through guides 72 carries plates 74 as well as pipes 68 along a predetermined path, the upper reach of which moves in the direction of trays 20 at the same linear velocity as the trays.

By means of the engagement of rollers 79 with track 80, plates 76 are made to follow the motion of the rollers as conditioned by the run of track 80. Since plates 76 are coupled to pipe 68, pipe 68 also follows the movement of rollers 79 in a transverse direction. As a result, it can be seen that the track and rollers, as related to plate 76 and thereby pipe 68, serve as means for successively advancing and retracting the conduit or pipe 68 with respect to its path of travel in order successively to engage and disengage socket 68 with respect to valve assembly 57 connected to the tray.

As shown in FIGS. 3 and 4, track 80 is routed inwardly toward the line of travel of trays 20 when socket 69 has been brought to a position at an angle of approximately 45° from the vertical. From this point on the inwardly extending position of track 80 drives rollers 79 and thereby socket 69 toward the line of travel of the trays. When track 80 returns to a direction parallel to the line of travel of trays 20, socket 69 is advanced to its innermost position in which it is adapted to engage valve assembly 57 of the tray.

Prior to the engagement of socket 69 with valve assembly 57, spring 48 biases arms 45 and thereby pipe 41 to a position in a direction opposite to the line of travel of the trays. Consequently valve assembly 57 is in a lagging position with respect to a vertical plane extending through pin 46. At the same time flat spring 56 urges support 47 toward its lowermost position. With valve assembly 57 somewhat depressed and in a lagging position it can be understood that the engagement of socket 69 with valve assembly 57 is facilitated since socket 69 rises and accelerates in a direction parallel to the travel of the trays as engagement with valve assembly 57 begins. The pivotal mounting of support 47 about shaft 49 provides the necessary freedom for socket 69 to elevate valve assembly 57 as engagement is completed. Similarly the pivotal mounting of arms 45 and pipe 41 provide a sufficient degree of freedom for the velocity of socket 69 in the horizontal direction to match that of valve assembly 57. Once engagement is completed arms 45 are moved against the bias of spring 48 to substantially a vertical position.

In order to enable rollers 79 to pass freely along track 80, it is necessary that the axis of rotation of the rollers be maintained in a substantially radial direction whenever the rollers are moving from one horizontal reach to the other of track 80. The tightening of chain 71 to maintain this relationship for the rollers is undesirable since excessive tightening of the chains can accelerate the wear of the chains and sprockets. By means of cogs 83 attached to plates 74 and by means of pins 84 mounted upon sprockets 81, the alignment and positioning of tie rods 75 and thereby rollers 79 can be maintained whenever the rollers pass from one reach to the other of track 80. Pins 84 are disposed in or adjacent pair on sprockets 81. The pair of pins are adapted to engage curved surfaces 83a of cogs 83 during movement between the reaches. In other words pins 84 engage the curve surfaces 83a in a manner analogous to the engagement of a roller of a roller chain with respect to the tooth of a chain sprocket. In this way the correctly aligned position of rollers 79 is maintained for all points along track 80.

After a period of travel of socket 69 in engagement with valve assembly 67, rollers 79 advance to the portion of track 80 where the track is routed outwardly away from the path of travel of the trays. This outwardly extending portion of track 80 causes roller 79 and thereby plate 76 to move away from the tray members and thereby carry socket 69 away from valve assembly 57 until disengagement takes place. Since socket 69 is beginning to move in an outward direction during disengagement, the pivotal mount of support 47 about shaft 49 permits valve assembly 57 to deflect downwardly. At the same time the resilient mounting of pipe 41 by way of arms 45 and spring 48 enables valve assembly 57 to respond along its line of travel to any change in velocity of socket 69 as disengagement takes place.

Since socket 69 is open to the interior of pipe 68, it is necessary to control the connection of pipe 68 to a source of fluid flow whether it be a pressure or a vacuum source. In order to accomplish this control each of pipes 68 are connected to rotor 85 of rotary valve assembly 86 (FIGS. 3, 4 and 5). The connection of pipes 68 to rotor 85 is accomplished by flexible hoses 87. Rotor 85 is provided with a recess 85a connected by tube 88 to each of hoses 87. The stator 89 of valve 86 is provided with a single recess 90 connected to line 91 which can extend to a pressure or a vacuum source.

The drive to rotor 85a begins with one of shafts 82 which is provided with drive gear 92 (FIG. 4). Drive gear 92 is connected through idler gear 93 which in turn meshes with driven gear 94 attached to shaft 95 by key 96 (FIGS. 4 and 5). Shaft 95 extends through stationary housing 97 connected to the stator. The shaft is supported by bushing 98 at the point of junction between stator 89 and housing 97. Rotor 85 is attached with axial freedom but circumferential restraint to shaft 95 by key 99. By means of nut 100 and spring 101 the preloading of rotor 85 against stator 89 can be adjustably selected to prevent leakage between the stator and rotor.

Housing 97 is supported by plate 102 which is attached by screws 103 to support 104. In turn support 104 is mounted by bearings 105 with respect to shaft 82 which carry sprockets 81 for driving chains 71. Support 104 serves as a mount for track 80. Support 106 which is also engaged with shafts 82 by bearings serves to carry bearing 107 for shaft 95 as well as a bearing for idler gear 93.

The gear ratios of gears 92 and 94 are selected to rotate rotor 85 through one complete rotation for each complete passage of one of sockets 69 and pipe 68 about track 80. With this arrangement recess 90 can successively apply pressure or vacuum to each of recesses 85a of rotor 85. By way of example, recess 90 can be formed in an arcuate manner with a center of curvature disposed at the center of shaft 95 and extend in a circumferential manner about shaft 95. With this arrangement, recess 90 is adapted to form a connection to a given recess 85a at the time of engagement as determined by track 80 and to maintain the connection of recess 85a to line 91 for the period of travel of socket 69 in engagement with valve assembly 57. As disengagement of the socket with respect to the valve assembly occurs in response to the change of direction of track 80, recess 85a passes beyond the end portion of recess 90 and thereby the application of pressure or vacuum is terminated.

Filter cake 108 can be removed from filter medium 32 by means of scraper 109 (FIG. 1) by a roller 111 (FIG. 17), or by an air knife or a pulsating air knife 116 (FIG. 16). As shown in FIG. 17 roller 111 which causes the material of cake 108 to adhere to the roller surface can be used to remove the cake from filter medium 32. As shown in FIG. 17 scraper 112 serves to strip the material from roller 111. After the removal of the filter cake, the filter medium can be subjected to a flow of fluid such as a washing liquid by means of one or more nozzles 113 (FIG. 1).

As shown in FIG. 14 after filter cake 108 is formed upon the filter medium of tray 20 and while top 34 remains engaged with tray 20, a portion of already filtered and washed filter cake material can be applied by delivery pipe 114 to form layer 115 upon filter cake 108. In this way the overall thickness of material disposed upon the filter medium is increased. Since it is known that most materials tend to adhere to themselves better than to another material, layer 115 and filter cake 108 tend to remain together after the removal of top 34. As a result the combined layer and cake strip together from the filter medium and fall from the tray conveyor. In other words by making the overall filter cake heavier, its separation from the filter medium can be insured.

As shown in FIG. 15 filter medium 116 is attached to tray 20 by rod 117 extending through side walls 23 of the tray. The end of filter medium 116 opposite to rod 117 is attached to weighted rod 118. The filter medium is of sufficient length that the medium can be stretched across the cavity of tray 20 and rod 118 can hang down over the trailing end of the tray as shown on the upper reach of trays 20 in FIG. 15. As tops 34 separate from trays 20, the filter medium initially remains in place upon tray 20. As tray 20 advances from the upper reach about sprocket 22, the filter medium under the influence of the weight of filter cake 108, can separate at the end adjacent to rod 118 and swing away from the tray about axes defined by rod 117. The impact resulting from the relative movement of the filter medium with respect to the tray insures that the filter cake is separated from the medium. As trays 20 enter upon the lower reach of conveyor chain 21, the filter medium assumes a substantially vertical position which enables it to be treated by jets of fluid such as liquid washes, air blasts or the like from one or more of nozzles 119. Nozzles 119 can be positioned to wash both sides of filter medium 116. When the trays begin to move from the lower reach to the upper reach of chain 21, filter medium 116 in response to the weight of rod 118, tends to drape itself across the cavity of the tray until the tray is again completely covered by the medium. Consequently upon arrival at the upper reach of chain 21, the filter medium once more extends in a substantially horizontal plane and completely covers the tray.

As shown in FIG. 14 transfer pipe assemblies 67 can be positioned adjacent to the lower reach of chain 21 in order to apply a flow of fluid with respect to filter medium 32 after the filter cake has been separated from the filter medium. The flow of fluid can comprise one or more liquid washes or the application of pressured gas or the like.

The traveling filter of the invention can consist of any number of trays 20 and thus the filter can be of any predetermined length. The number of transfer pipe assemblies 67 is determined by the length of the traveling filter and also by the number of treatments which are to be applied to trays 20 and the duration of the period of the treatments. The feed of material to be filted is applied through tops 34 to filter medium 32 of trays 20 shortly after the tops are positioned along their lower reach in registry and in engagement with its trays on their upper reach. By way of example, the first transfer pipe assembly in the direction of movement of the trays can apply vacuum to the trays. As filtration proceeds wash water may be introduced through the tops either separately or concurrently with the engagement of transfer assembly 67 to the tray. After filtration and washing are completed further drying of the cake may be accomplished by the continuation of the application of vacuum to the trays by an additional number of transfer assemblies 67.

The valve timing of rotary valve 86 can be set to provide a connecting or open condition for a brief period after disengagement of socket 69 which valve assembly 57 occurs, for example. This arrangement enables the vacuum applied to line 68 and socket 69 after disengagement to remove any liquid within the line and socket so that they do not spill such liquid prior to their next engagement with the valve assembly.

After separation of the tops from the trays, the filter cake can be removed from the filter medium and a reverse blow can be applied to the filter medium and the cake disposed thereon by means of a transfer assembly 67 disposed adjacent to the lower reach of chain 21. In addition, as described above, scrapers or rollers or the like can be utilized to remove the filter cake. Once the cake is removed from the filter medium, the filter medium can be washed by the use of sprays or by the use of fluid flow delivered to the trays by one or more transfer assemblies 67.

Experience with the traveling filter apparatus of the invention has shown that the edges of end walls 38 of tops 34 can cause wear of filter medium 32 at the locations where the tops move into and move out of register with trays 20 (FIG. 7). The wear is caused by relative motion between the top and the filter medium disposed upon the tray as the tops and trays successively engage and disengage with respect to one another. In addition to causing wear by the relative motion between the tops and the filter medium during separation of a top from a tray, the trailing end wall 38 of the top tends to move relative to the tray in the direction of travel of the tops and trays and thereby tends to pile up a portion of the filter cake against the inner surface of the end wall. This is an undesirable condition since any accumulation of filter cake on the inner surface of the top can subsequently drop from the top and be lost. in addition, filter cake material falling from the inner surface of the end wall of the top can soil the machinery and the work area, both of which are undesirable operating conditions.

In order to overcome the possibility of causing wear of the filter medium during engagement and disengagement of a top with respect to a tray and in order to prevent dripping and the waste of filter cake material from the tops after separation, tops 120 are driven by the arrangement shown in FIG. 18 while the trays and their drive correspond to that shown in FIG. 1. The trays 20 are attached by brackets 28 to conveyor chain 21 which advances about sprockets 22.

Each of tops 120 is provided with eye brackets 121 extending from side walls 122 of top 120. Through eye brackets 121 extend rods 123 having stops 124 and 125 at the opposite ends thereof. The end of each of rods 123 opposite to the end adjacent to eye bracket 121 slidably extend through guide 127. Each of guides 127 is connected to support 127a which is attached to chain 126 by means of bracket 128 and pin 129.

As shown in FIG. 18, pin 129 extends into an elongated opening 130 disposed at one end of support 127a. The slot of support 127a accommodates the relative movement between pin 129 and bracket 128 whenever the top passes about sprockets 130 upon moving between the upper and lower reaches of conveyor chain 126.

Figure 19:
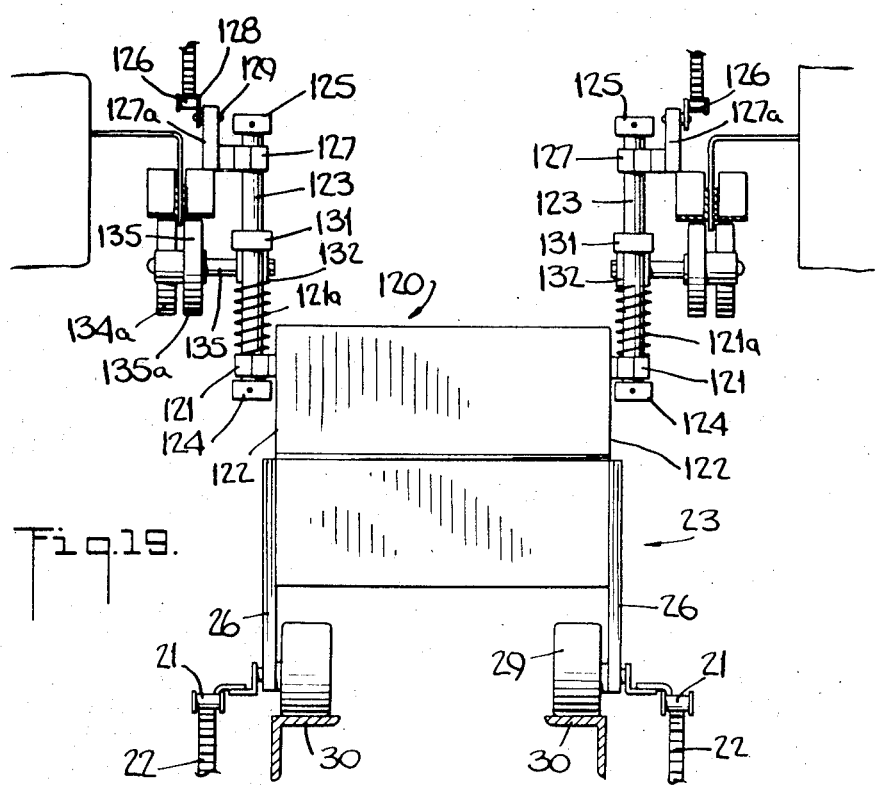
FIG. 19 is a fragmentary vertical section view taken along the line 19—19 in FIG. 18 and showing the suspension of the top with respect to the chains and the means for camming the top into engagement with the tray.

As shown in FIG. 19, there is provided collars 131 secured to rods 123. Carrier bar 132 has forked ends which engage rods 123. The forked ends of carrier bar float on rod 123 between collar 131 and the end of spring 121a adjacent thereto. The springs normally urge carrier bars 132 against collar 131 and eye brackets 121 against stops 124. To the carrier bars are attached axles 134 and 135 upon which are mounted wheels 134a and 135a, respectively. Wheels 134a have a greater tread dimension between themselves than do wheels 135a.

On the upper reach of chains 126, eye bracket 121 together with rods 123 move downwardly with respect to chains 126 until collars 131 bear upon guides 127. Springs 121a urge carrier bars 132 against collars 131 so that the carrier bars and the wheel attached thereto descend with rods 123.

Upon approaching and subsequently leaving the lower reach of chains 126, tray 120 assumes an inverted position below chains 126. Upon entering inverted position, top 120 and rods 123 move downwardly with respect to guides 127 and away from chains 126. Eye brackets 121 bear downwardly upon stops 124 and cause rods 123 to move downwardly with respect to guides 127 until stops 125 rest upon the guides. In this position springs 121a support carrier bars 132 and thereby wheels 134a and 135a.

As leading wheels 134a pass beneath sprocket 130 and approach the lower reach of chains 126, the leading wheels because of their greater tread dimension are adapted to pass to each side of cam track 137. At the same time wheels 134a enter into engagement with tracks 136 disposed below cam tracks 137. Prior to the point that wheels 134a engage cam track 136, the wheels and the top move in a substantially radial manner with respect to the center of rotation of sprocket 130. As wheels 134a contact track 136, the position of the track causes the leading portion of top 120 to be raised sufficiently to insure that the top does not contact tray 23.

As top 120 advances toward a horizontal position along the lower reach of chains 126, wheels 134a continue to travel along tracks 136. Wheels 134a then approach cam track 138. At the same time wheels 135a which have a smaller tread dimention than wheels 134a approach cam track 137. When wheels 134a engage ramp 138a of cam track 138 and wheels 135a engage ramp 137a of cam track 137, the wheels are simultaneously urged downwardly. Ramp 136a of track 136 permits wheels 134a to descend. Since the wheels descend simultaneously, the top is lowered toward the tray in a horizontal position toward engagement with the tray.

The fact that top 120 descends in a horizontal plane in response to the action of ramps 138a and 137a causes the top gradually to come to rest upon the tray as both the top and tray advance at substantially the same speed. Since the facing surfaces of the top and tray extend horizontally at the point of engagement, the top is prevented from locally engaging the tray and the filter medium upon the tray and thus is prevented from damaging or wearing the filter medium during operation.

When wheels 134a and 135a roll along cam tracks 138 and 137, respectively, the wheels transmit force through carrier bars 132 and springs 121a to eye brackets 121. In this way the engagement of the wheel with the cam tracks urges top 120 against tray 23.

Upon advancing to the end portion of the lower reach of chains 126, wheels 134a engage cam tracks 139 as wheels 135a engage cam track 140. As a result, top 120 is lifted vertically with respect to tray 23 and the top is maintained in a horizontal plane as separation from the tray occurs. In this way the trailing end wall of the top is lifted directly away from the tray and cannot scrape the filter cake against the inner surface of the end wall of the top. Interference with the filter cake is eliminated since the initial lifting of the top occurs prior to the point at which the top begins to pass around sprocket 130.

Since neither the trays nor the tops are attached at their end portions to the carrier chains, the trays and tops travel in an arc when going over sprockets 130 and the travel carries the leading edges of the trays and frames beyond the plane in which they travel when in register. As a result, it is necessary to suppress this tendency for the leading edges to extend beyond the plane in which they travel when in register. This can be done by making the tray conveyor slightly longer than the frame conveyor and by suppressing the arc of travel of the frames as shown in FIG. 18.

Tray 14 (FIG. 20) is provided with deck plate 142 having openings 143 and relieved portion 144 extending about the periphery of the deck plate. A gasket 145 of elastomeric material is disposed in relieved portion 144. In addition the lower edge of top 146 is provided with gasket 147. The inner surface 146a of top 146 is substantially in alignment with the inner edge of gasket 145. The facing engagement of gaskets 145 and 147 prevent any leakage whenever the top is resting upon the tray.

Figures 20, 21:
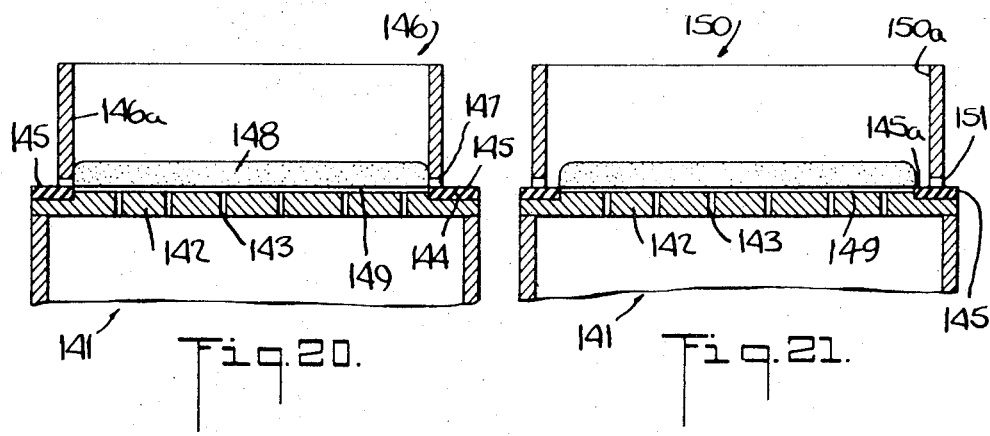
FIG. 20 is a fragmentary vertical section view showing a top disposed upon the tray with the filter cake extending into contact with the top.
FIG. 21 is a fragmentary vertical section view showing the top disposed upon the tray with the filter cake offset from the top.

Filter cake 148 builds up at least for a portion its thickness along the inner surface of top 146 (FIG. 20) since the inner surface 146a of the top adjoins the active surface of the deck plate. Where the contact between the filter cake 148 and top 146 might prevent the complete removal of the filter cake from both the top and the filter medium 149, the top 150 can be provided in place of top 146 as shown in FIG. 21. In top 150, gasket 151 engages the central portion of gasket 145 of tray 141. As a result, the top encompasses a border area 145a of gasket 145 which is an inactive filtering area due to the absence of openings 143. As a result, the filter cake is confined to the surface of deck plate 142 and does not extend appreciably across gasket 145. Therefore, upon the build up of the filter cake it can be seen that the cake does not abut the inner surface 150a of top 150. Thus the possibility of the cake clinging to the inner surface of the top is removed.

In FIGS. 22–25, apparatus 200 for removing filter cake 108 from filter medium 32 is shown. Apparatus 200 includes roller 201 which is mounted on shaft 204 which is supported for rotation by bushings 202a in plates 202. Roller 201 is perforated by a plurality of openings 207 which place the outer surface of the roller in communication with its interior. The perforated outer surface of the roller is covered by filter medium 205 which can be any one of a number of different porous materials such as those used for filter medium 32. The end portions of the filter medium 205 and the roller 201 are covered by end caps 206. Since the end caps enclose the filter medium and roller, the outside diameter of the end caps extends above the surface of filter medium 205.

Shaft 204 is provided with passage 208 at one end thereof which is connected to coupling 209. Vacuum line 210 extending through stationary support 210a is connected to coupling 209. Coupling 209 includes a ring 209a rotatably mounted upon shaft 204 and formed from material which is suitable for a bearing surface such as plastic material. Ring 209a is positioned against seal ring 209b. Stationary housing 209c of the coupling is urged against seal ring 209d by the biasing force of spring 209e. In this way a vacuum source can be connected to rotating shaft 204 in order to apply vacuum to the interior of cylinder 201.

Figure 22:
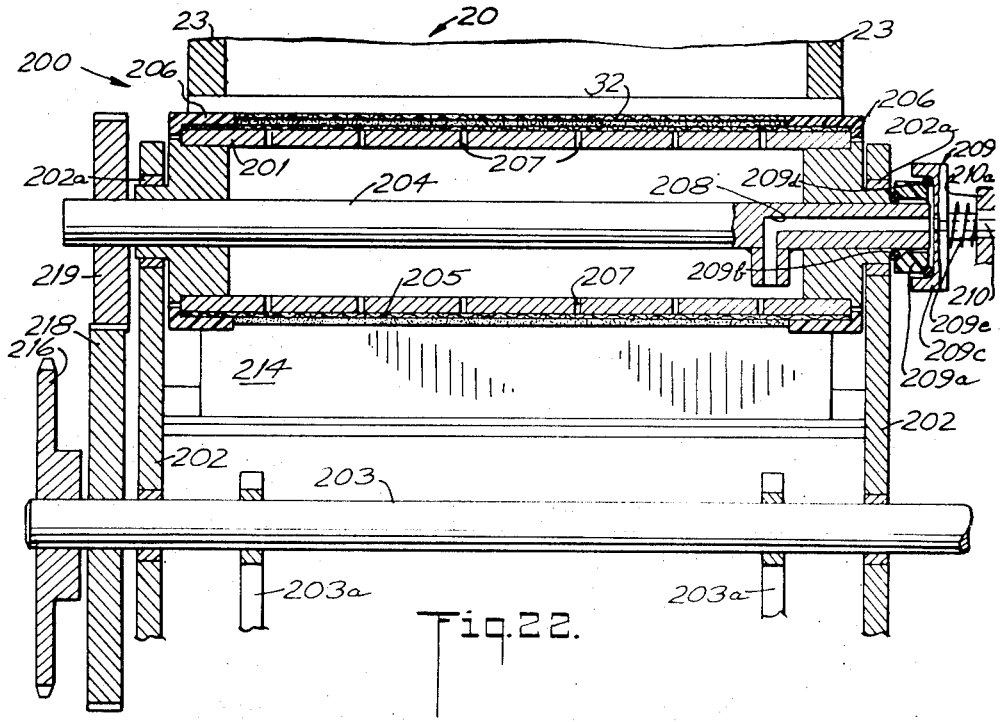
FIG. 22 is a cross section view of a modified structure for removing the filter cake from the filter medium.
Figure 23:
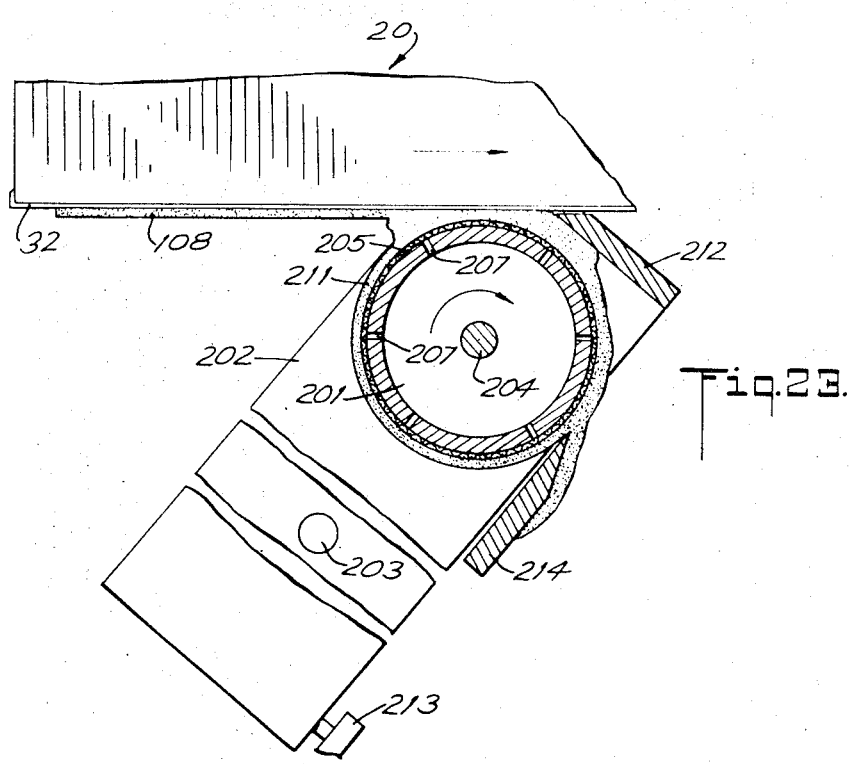
FIG. 23 is a side view of the modified structure of FIG. 22.

Roller 201 is driven in rotation by a drive including chain sprocket 216 mounted upon shaft 203 which is supported by plates 202. The rotation of shaft 203 drives gear 218 mounted thereupon and which in turn engages gear 219 mounted upon shaft 204. As shown in FIGS. 22 and 23 evacuated roller 201 is positioned adjacent to the bottom surface of side walls 23 of trays 20. The bottom edges of side walls 23 are in contact with end caps 206 and filter medium 32 of the trays extends between the end caps and is spaced apart and with a closed clearance to filter medium 205. Roller 201 is driven with a peripheral speed which is in the same direction and slightly greater than the surface velocity of the face of the tray.

In response to the negative pressure applied to the interior of roller 201 filter medium 205 accumulates filter cake 211. As cake 108 on filter medium 32 contacts cake 211 on filter medium 205 cake 108 tends to transfer to roller 201. The tendency of transfer results from the characteristic that the cake material has a tendency to adhere to like material which is stronger than its tendency to adhere to a filter medium. The transfer also is brought on by the pressure differential resulting from the negative pressure applied to roller 201.

At a point somewhat more than 90° beyond the location of minimum clearance between filter medium 32 and roller 201, there is disposed scraper blade 214 mounted upon plates 202. The scraper blade which has a beveled edge removes the excess thickness of filter cake being formed upon roller 201 as it strips filter cake 108 from filter medium 32 of the trays. The excess material removed by scraper blade 214 drops into a suitable receiver for handling the product being recovered. The scraper blade is set with a predetermined clearance between it and filter medium 205 by being placed in contact with end caps 206 in order to maintain some thickness of filter cake beyond the point at which excess is removed in order that there is always a filter cake upon the evacuated roller as it is presented to filter cake 108 on the filter medium of the tray. By way of example, a cutting having a thickness in the range of about one-sixteenth of an inch can be left upon filter medium 211 to provide an adhesive surface for the next contact with the filter cake upon the tray.

Plates 202 which support roller 201 and in turn supported by being pivotally mounted upon shaft 203 which in turn is supported by frame members 203a. Plates 202 and thereby the evacuated roller are biased to move in a counterclockwise direction as viewed in FIG. 23 about shaft 203 so that roller 201 is urged toward tray 20. The biasing can be provided by means of a counterweight or spring arrangement suitably connected to plates 202 with respect to the axis of shaft 203. In order to prevent roller 201 from applying excessive upward contact force with respect to tray 20, the counterclockwise movement of plates 202, as shown in FIG. 23, is adjustably determined by means of stop 213.

The evacuated roller eliminates the problem of conventional discharge rollers which consist of a closed metal cylinder and a knife for scraping off excess cake. The most serious problem with conventional rollers is that the scraper is incapable of doing a precise job of removing the filter cake or heel from the roller. As a result, the heel at random locations along the roller, pulls completely away leaving bare areas. These bare areas in the heel prevent the cake from being picked off as they pass adjacent to the filter device.

The evacuated roller 201 eliminates this problem by maintaining a uniform heel in response to the vacuum applied to filter medium 205. During operation a slight upstream heel in the area where the filter medium 205 is approaching cake 108 insures heel cake contact. When filter cake 108 is thicker than the dimension of the outer surface of end caps 206 over filter medium 205, cake 108 is completely removed from filter medium 32. When filter cake 108 is thinner than the dimension of the outer surface of the end caps to filter medium 205 complete separation of filter cake 108 may not occur. Where such a condition can exist knife 212 having a beveled edge is mounted upon plates 202 as shown in FIG. 23. Knife 212 is mounted at a distance from the surface of the filter medium 205 and also with a clearance with respect to filter medium 32 of the trays. By way of example, the distance between knife 212 and roller 201 can be in the range of approximately six to ten times the heel depth from the roller. Knife 212 picks up any filter cake material which roller 201 misses. The cake material builds up upon the edge of knife 212 and when it reaches a degree of build-up where it contacts the material of roller 201, it is picked up by the roller and discharged with the remainder of the material at knife 214. Knife 212 is prevented from touching filter medium 32 by stop 213.

As shown in FIG. 24, evacuated roller 201 is driven by gear 219. Gear 219 is meshed with gear 218 which is driven by sprocket 216. Chain 217 connects sprocket 216 yo sprocket 215 attached to the shaft supporting chain sprocket 22 which drives the tray members. The peripheral velocity of roller 201 is in the same direction and generally somewhat greater than the linear velocity of tray member 20. The ratios of the gears and sprockets can be varied in order to insure that complete removal of cake 108 takes place. If the rotation of evacuated roller 201 is of an insufficient velocity, it is possible for the upstream pile of material, that is the merging of cake 108 and the heel on the evacuated roller, to become excessive and interfere with complete removal. Increasing the rotational velocity of roller 201 eliminates any condition of this type. Thus the speed of roller 201 is adjusted to keep the pile-up between roller 201 and the trays at a minimum although some degree of pile-up is desired. The degree of pile-up should be sufficient to extend laterally across the path of the incoming cake 108 in order to insure that an adhesive surface is presented to the entire incoming cake; however, the build-up must not be of sufficient length and size to cause it to extrude over end caps 206. At the same time the build-up must not be in excess of the amount which can be taken up by roller 201 between the time the trailing edge of cake 108 goes through and the end of the tray is reached. In this way cake 108 is prevented from being forced into the spaces between the trays.

As shown in FIGS. 25, the arrangement includes evacuated roller 201' for removing a filter cake from a filter medium can be utilized with conventional rotary vacuum drum filters such as filter 220. Filter 220 rotates in the direction indicated by the arrow in FIG. 25 and accumulates filter cake 221 from filter material disposed in reservoir 220a in response to vacuum applied to the interior of drum filter 220. Evacuated roller 201' similar to that described above is supported plates 202' adjacent to drum filter 220 at a point where filter cake 221 is in a condition to be removed. Plates 202' are pivotally mounted about shaft 203'.

As discussed with respect to the arrangement shown in FIG. 23, a roller 201' is provided with scraper blades 214' and 212'. Plates 202' can be biased by springs or the like to move in a clockwise direction about shaft 203' and thereby bring scraper blade 212' adjacent but spaced from the surface of the filter medium on the filter drum. Adjustable stop 213' limits the clockwise movement of plates 202' and thereby prevents scraper blade 212' from being positioned excessively close or in contact with filter drum 220. Evacuated roller 201', as shown in FIG. 25, has a drive which includes sprocket 25a, chain 225b, sprocket 225c and gearing between sprocket 225c and the evacuated roller.

In operation of the traveling filter it is necessary to have a feeding system for the unfiltered slurry and for wash water which will supply accurate amounts to each tray. The feeding system must operate with a minumum of splash of the slurry of wash water and be capable of spreading the material to be filtered as evenly as possible over the area of the tray. Since there are spaces between the adjacent end portions of adjacent trays and frame members or tops 34, a continuously flowing stream of slurry or wash water could run between the tops adjacent their end portions.

Figure 26:
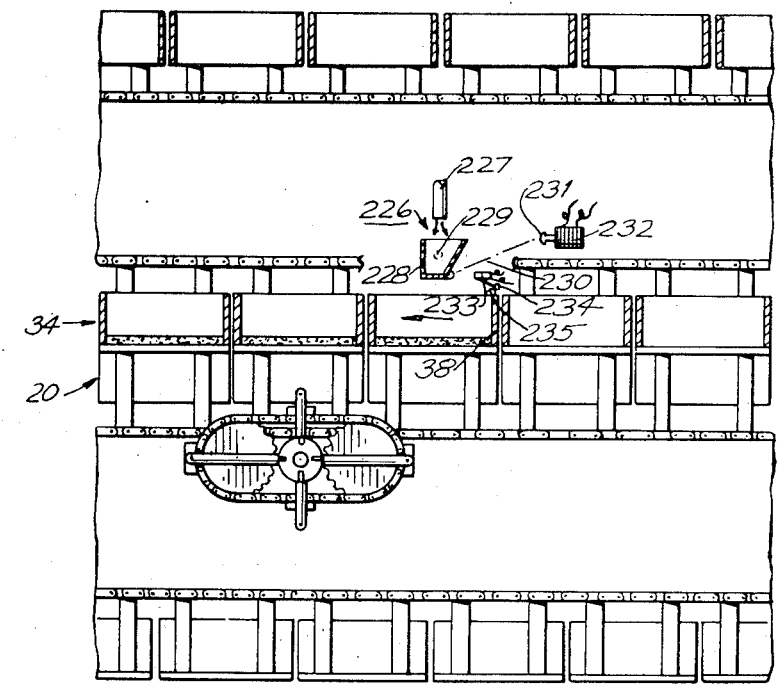
FIG. 26 is a fragmentary vertical section view of an intermittent delivery means for the trays.

Intermittent feeding of the slurry or wash water can be provided by delivery assembly 226, as shown in FIG. 26. Assembly 226 includes pipe 227 similar to pipe 40 in FIG. 1 which empties into hopper 228 pivotally mounted above the path of travel of the trays by means of shaft 229. As a result, the hopper is adapted to deliver material through tops 34 and onto trays 20. Hopper 228 can be operated by means of actuator 232 which includes reciprocating arm 231 coupled to linkage 230 which connects to the hopper. Actuator 232 can be controlled by a switch device responsive to the movement of either tops 34 or trays 20. As shown in FIG. 26, actuator 232 is controlled by switch 233. The switch is provided with arm 234 which is moved upon being engaged with projecting tab 235 from the trailing wall 38 of top 34. In this way the relative position of any cake top or tray can be related to the operation of hopper 226 by actuator 232.

When a tray comes under hopper 228 tab 235 trips arm 234 of switch 223 and thereby completes a circuit to actuator 232. Arm 231 of the actuator moves in response to the completing of the circuit and pivots the hopper about shaft 229 so that its contents are dumped through top 34 onto tray 20. The flow of material through pipe 227 can be maintained continuously since the hopper can receive material from pipe 227 when the hopper is in its actuated position releasing material onto tray 20 below. The hopper is returned to its non-dispensing position prior to the passage of the end portion of the tray member beneath the hopper in order to prevent the spilling of material between adjacent end portions of adjacent trays.

The hopper is shaped to substantially correspond but not exceed the width of the open space of the tops in order that the hopper may spread the material to be filtered substantially across the entire width of the tray. Where the dumping of the hopper is actuated by the top or tray, it is possible to isolate a tray from receiving a charge of material by removing the member which activates the actuation of a hopper such as removing projecting tab 235, as shown in FIG. 26. This would be done in case there was some failure of the filter medium or other portion of one of the trays or its mating top. Consequently, a tray could be made to pass through the loading and washing areas without being affected by either operation.

Where a constant flow is delivered by pipe 227 to hopper 228 and the operation of the hopper is to be interrupted it would be possible for the hopper to receive a double charge of incoming material during the passage of one of the tray members without actuation of the hopper. If it is desired to eliminate a double charge a suitable valve in pipe 227 operated by switch 233, or the like, can interrupt the feed to the hopper. In addition, the hopper can be provided with an overflow device to absorb a double charge. Furthermore, conventional liquid level measuring equipment can be applied to the hopper in order to sense and prevent the feeding of a second charge on top of a first charge.

Figure 27:
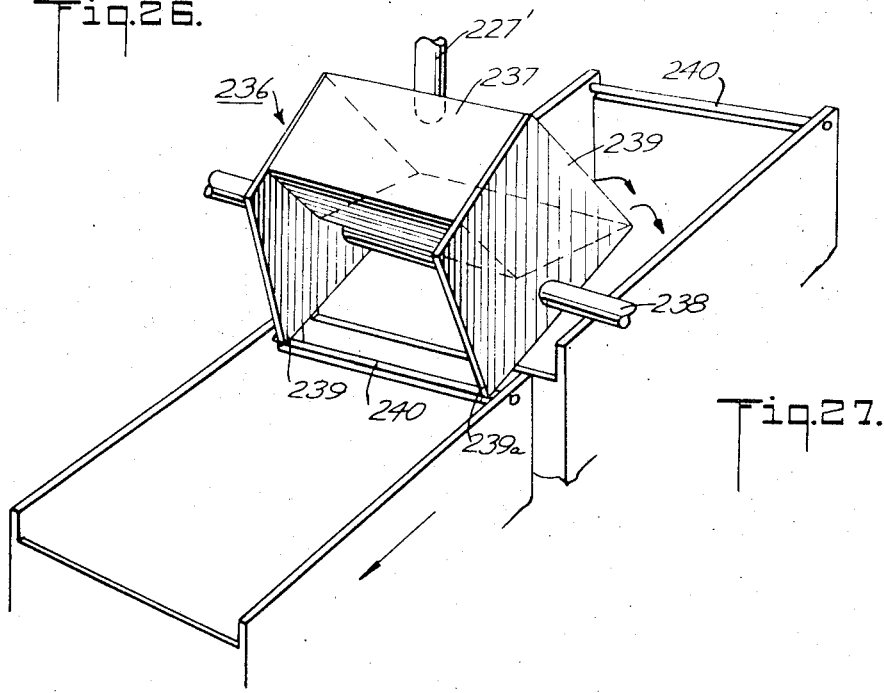
FIG. 27 is a perspective view of a modified intermittent delivery means.

Referring to FIG. 27, an intermittent delivery assembly 236 which is mechanically operated as by gravity can be used to feed the trays. The delivery assembly 236 includes a hopper 237 which is pivotally mounted on a shaft 238 in the frame of the conveyor and which includes a pair of depending side walls 239. The side walls 239 of the hopper are provided with extensions 239a which are dimensioned to project into the plane of a striker plate or bar 240 at the rear wall of the tray, the forward wall of the tray being of less height than the striker plate so as not to contact the hopper side walls 239. The hopper is shaped and mounted so that under gravity it assumes an upstanding position facing the pipe 227'.

In operation, as a rear wall of a tray passes under the hopper 236, the depending side wall portions 239 are pushed in the direction of travel of the tray by the striker plate on the rear wall to pivot the hopper about shaft 238. Upon pivoting, the hopper empties its contents received from pipe 227' into the next tray. After the tray has traveled past the point of common contact with the hopper side walls, the hopper 237 pivots in the opposite direction under the force of gravity to assume its initial position. This prevents further flow of material into the tray. The hopper is then in position for a repeated operation.

The hopper 237 is shaped to extend over the space between the trays so that upon pivoting to empty its contents, none of the contents will spill into the space between the trays. Since the hopper is dimensioned to receive the flow from pipe 227' even when the hopper is tilted, there is no need to interrupt the flow and the flow cannot spill between the tops.

In either of the above delivery assemblies 226, 237, by arranging the pivotal dumping action of the respective hoppers to be actuated by the trays, it is possible to isolate a tray from receiving a charge of material, especially in case of a broken filter medium or mechanical failure of a tray. This is done by removing from the tray the respective projecting tab 235 or striker plate or bar 240 so that the tray rides past the hopper without being filled and without affecting the other operations of the apparatus. At the same time, in order to avoid a loss of vacuum, the tray can be fitted with a valve (not shown) which blanks the tray from the source of vacuum.

Figures 28, 29:
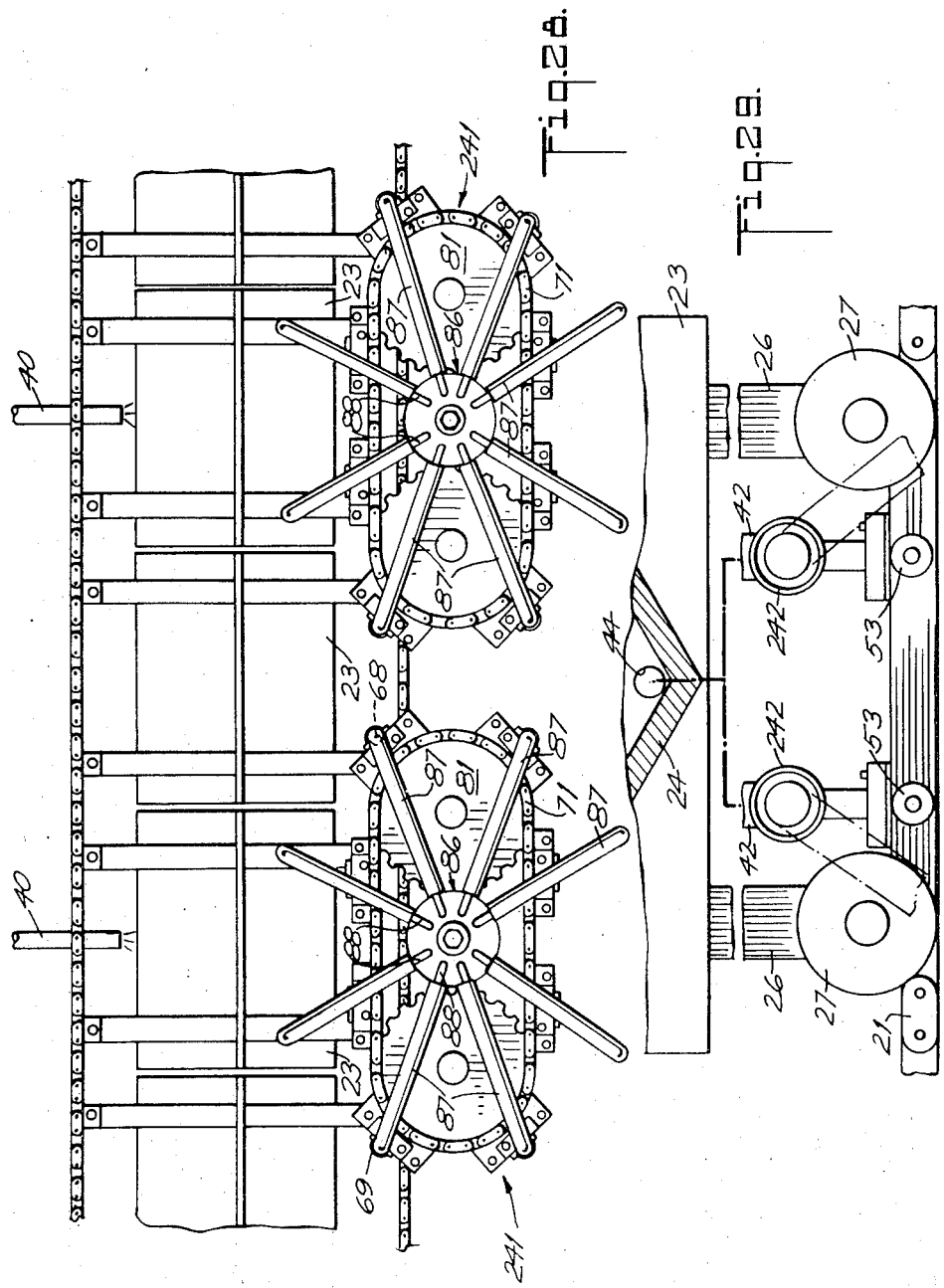
FIG. 28 is a modified assembly of conduits.
FIG. 29 is a vertical section view of a modified tray for use with the conduits of FIG. 28.

Referring to FIG. 28, modified transfer assemblies 241 are constructed in similar fashion as transfer assemblies 67 (FIGS. 5 and 6) and like reference characters refer to like parts; however, transfer assemblies 241 have twice the number of assemblies of pipes 68 and sockets 69, for example, eight, with a corresponding number of related parts connected to the valve 86, as compared to the four assemblies of the transfer assembly in FIG. 5 and 6. The sockets 69 of transfer assemblies 241 are spaced apart intervals which are one-half the distance between the sockets 69 of transfer assemblies 67 in FIGS. 5 and 6.

Referring to FIG. 29, each of the trays which cooperate with the transfer assemblies 241 have a pair of pipes 242 each of which is similar to pipe 41 (FIG. 7). The pipes 242 are interconnected with similar components as pipe 41 with like reference characters indicating like parts. Each of the pipes 242 communicate with the opening 44 of side wall 23 through a common hose line (not shown) connected to the hoses 42 associated with each pipe 242.

The valve assemblies 57 (FIG. 10) of pipes 242 are adapted to mate with the transfer assemblies 241 in a similar manner as described above. As each tray comes into coincidence with the transfer assembly, one transfer assembly 242 couples with a valve assembly 57 and a short time later the next transfer assembly 241 couples with the other valve assembly 57. The tray continues to move with both transfer assemblies operating under a vacuum. Subsequently, the transfer assemblies are uncoupled from the valve assemblies in sequential manner. The cooperation of these assemblies causes a tray to have a longer dwell time under vacuum so as to increase the effect of such on the filter cake.

The dwell time of the application of vacuum to the trays can be increased to a condition of continuous dwell time by increasing the number of pipes 242 to a plurality of pipes. Increasing the number of pipes 242 requires an increase in the number of pipes 68 for transfer assembly 241. By way of example, to apply two pipes 242 in place of one to the trays and to maintain the same transfer assembly, it is necessary to use twice the number of pipes 68 on the transfer assembly.

In FIGS. 22–25, the evacuation roller 201 is shown removing filter cake 108 from travelling filters 20 and 220. It has also been found that the evacuation roller 201 removes filter cake 108 from stationary filters. For example, referring to FIG. 30, apparatus 200 for removing filter cake 108 from a stationary filter medium 32 is shown. The various parts of the apparatus 200 illustrated in FIG. 30 correspond to those parts having the same numbers shown in FIG. 23. Thus, evacuation roller 201 is mounted on shaft 204 which is mounted for rotation by plate 202. Plate 202 which supports roller 201 is pivotally mounted about shaft 203 which in turn is supported by a frame member (not shown). Plate 202 and thereby the evacuation roller 201 are biased to move in a counterclockwise direction about shaft 203 so that roller 201 is urged towards filter tray 20. Roller 201 is driven for rotation in a clockwise direction by a driving means (not shown).

As noted above, the filter tray is stationary and the evacuation roller travels along a path substantially parallel to the bottom surface of side walls 23 of tray 20 so that the upper portion of the periphery of the roller 201 is adjacent the filter medium 32. Roller 201 is driven with a peripheral velocity which is slightly greater than the velocity of travel of the roller 201 along the stationary filter medium 32. As the evacuation roller 201 travels along the filter medium, it removes the filter cake 108 in the same manner as described with respect to FIGS. 22–24.

Now, referring to FIGS. 31–33, a means is shown which permits a continuously flowing stream of slurry or wash water to be delivered from pipe 40 into trays 20 as they travel beneath the pipe. A plurality of splash guards 250 are mounted to the conveyor chains 37 for advancement with the frame members 34. Each splash guard 250 provides a cover or shield for the space between one pair of adjacent frame members 34 and directs the continuously flowing slurry or wash water from pipe 40 into the opening of at least one of the adjacent frame members 34 as the space therebetween passes beneath the pipe. Each splash guard 250 comprises a "V"-shaped member 251 which is disposed between the conveyor chains 37 and the space between the corresponding pair of adjacent frame members 34. The longitudinal axis of the "V"-shaped member 251 is substantially parallel to the adjacent walls of the pair of adjacent frame members 34. As shown in FIG. 31, the open portion of the "V"-shaped member 251 extends towards the pair of adjacent frame members 34 and away from the conveyor chains 37.

One method of mounting the splash guards 250 to the conveyor chains 37 is shown in FIGS. 32–33. The "V"-shaped member 251 extends between two mounting plates 252, only one of which is shown in FIG. 32. One mounting plate is attached to a corresponding lug 253 on each of the conveyor chains 37 by means of a bolt and nut assembly 254. The relative position of the mounting plate 252 with respect to the conveyor chain 37 is maintained by means of a post 255 extending from the chain 37 through an elongated slot 256 in the plate 252. The elongated slot 256 restrains general movement of the mounting plate about the bolt; however, it permits relative movement of the post 255 with respect to the bolt as the conveyor chain 37 advances around sprockets 39.

Accordingly, each splash guard 250 advances with the corresponding pair of adjacent frame members 34, and the "V"-shaped member 251 shields the space therebetween and directs the continuously flowing slurry or wash water from pipe 40 into the opening of at least one of the adjacent frame members 34 as the space between the adjacent members advances beneath the pipe.

According to a further embodiment of the present invention, the moisture content of the filter cake can be reduced still further by the application of heat to the filter cake after it has been formed, washed and dried by vacuum. Referring to FIG. 34, a modified traveling filter of the type described with respect to FIG. 1 is shown. The upper reach 21a and the lower reach 21b of the endless conveying chain 21 driving tray members 20 are extended beyond the point where the frame members 34 are removed from registry and substantial engagement with the filter medium 32 of the tray member 20. The tray members 20 are advanced along the upper reach 21a having a first portion where the filter cakes 108 are formed, washed and dried by vacuum, as described with respect to the embodiment of FIG. 1, and a second portion where the filter cakes 108 are further reduced in moisture content by the application of heat thereto.

Heat can be applied to the filter cakes 108 as they advance along the second portion of the predetermined path in one of several ways. For example, hot air can be blown or driven across the surface of the filter cakes 108 as the tray members 20 advance along the second portion of the upper reach 21a. Accordingly, referring to FIGS. 34–35, a hood assembly 260 is mounted above the tray members 20 advancing along the second portion. The hood assembly 260 is adapted to confine the hot air adjacent the filter cakes 108 as they advance beneath the hood. Hot air from a furnace 261 is provided to one end of the hood assembly 260 by means of a blower 262 and a supply duct 263. As the hot air is driven across the filter cakes 108, some of the hot air escapes from the opening in the bottom of the hood 260. The hot air which passes along the length of the hood is removed by a vacuum applied to a removal duct 264 at the other end of the hood assembly 260.

The amount of the moisture driven off from each filter cake is a function, among other things, of the temperature of the hot air driven across the filter cakes 108 and the length of the hood assembly 260. Thus, for a given temperature of the hot air, the length of the hood 260, and consequently the length of the upper and lower reaches 21a and 21b, can be extended as far as necessary to apply the amount of hot air required to achieve the desired degree of dryness of the filter cakes 108. Accordingly, the length of time during which heat can be applied to the filter cakes is not dependent upon the length of time required to form the filter cakes on the filter medium.

In FIG. 34, the hot air is driven across the filter cakes 108 along a path parallel to the path of travel of the tray members 20. The hot air can also be driven from the center of the filter cakes 108 towards the sides thereof or from one side of the filter cakes 108 to the other side thereof. For example, referring to FIG. 36, a hood assembly 270 is shown wherein the hot air is driven from the center of the filter cakes 108 to the sides thereof. The hot air enters an opening 271 in the center of the hood assembly 270 which extends substantially along the length of the hood. As shown by the arrows, the hot air flows through the opening 271 and towards the opposite sides of the filter cakes 108 where the hot air is drawn into two ducts 272 by a vacuum applied thereto.

Referring again to FIG. 34, a second means of drying the filter cakes is shown. A transfer assembly 275, similar to the transfer assembly 67 described with respect to FIGS. 3-6, is provided to drive a hot air into the interior of the tray members 20 as they pass adjacent the transfer assembly and up through the corresponding filter member 32 and filter cake 108. A detailed description of the transfer assembly and the operation thereof is provided above. Therefore, the description below will only include those features necessary to adapt the transfer assembly to provide a hot gas to heat the filter cakes.

A source of pressurized hot air (not shown) is provided to supply hot air to pipe 82 of the transfer pipe assembly 275. As successive tray members 20 advance adjacent the transfer pipe assembly 275, one of the sockets 69 on one end of conduit 68 engages the valve assembly 57 of the tray member 20. In response to the rotary valve assembly 86, the pressurized hot air passes through the appropriate conduit 68 and into the interior of the corresponding tray member 20. The hot gas is thus driven up through the filter member 32 of the tray member 20 and adjacent the filter cake 108 formed thereon.

In an alternative embodiment, the transfer assembly 267 is provided to draw the hot gas passing under the hood assembly 260 through the filter cakes 108. Thus, the pipe 82 is coupled to a vacuum source (not shown). As the conduits 68 are engaged with successive tray members moving along the second portion of the upper reach 21a, the hot air driven across the filter cakes is also drawn through the cakes thereby further reducing the moisture content of the filter cakes.

The moisture content of the filter cakes can be reduced by driving the hot gas across the top of the filter cakes, for example, by means of the hood assembly 260, by driving hot gas through the filter medium and filter cakes, for example, by means of a transfer pipe assembly 67, or by a combination thereof.

The hot gas used to dry the filter cakes can be provided from a furnace, from steam coils, or from any other source. Further, heat from sources other than hot gas can be applied to the filter cakes. For example, infra-red lamps or induction heaters would provide a suitable alternate source of heat to drive off the moisture content of the filter cakes.

Although various embodiments of the invention have been shown and described herein, it is understood that certain changes within the scope of the appended claims may be made by those skilled in the art without departing from the scope and spirit of this invention.

I claim:

1. A traveling filter comprising a plurality of tray members, means for conveying said plurality of tray members along a first line of travel and along a second line of travel, said tray members being inverted along the second line of travel, and a filter medium disposed upon each of said tray members and being adapted to receive a filter cake during operation, said filter medium being attached to one end portion of the opposite end portions of said tray member which are disposed along the line of travel of said tray member, and a weighted member for drawing said filter member across the other of said opposite end portions when said tray member is being conveyed along the first line of travel, whereby the filter cake is released as said filter medium is adapted to be swung in response to said weighted member about said one end portion and away from said tray member when said tray member is conveyed into or inverted position on the second line of travel.

2. An apparatus in accordance with claim 1 in which said conveying means advances said tray members along upper and lower reaches corresponding to the first and second lines of travel, said filter medium being attached to the end portions of said opposite end portions of said tray member which is toward the direction of travel of said conveying means, whereby said weighted member is free to fall and swing said filter member with respect to said tray member as said tray member passes from said upper to said lower reach.

3. A method of separating a filter cake from a filter medium disposed upon a tray member comprising the steps of conveying the tray member along a first line of travel upon which the tray member is erected, the filter medium being movably attached to the tray member, directing material to be filtered toward the filter medium of the tray member as it is conveyed along the first line of travel, and conveying the tray member along a second line of travel upon which the tray member is at least in a partially inverted position, whereby the conveying of the tray member from an erected position on the first line of travel to at least a partially inverted position on the second line of travel causes the filter medium to move with respect to the tray member and thereby assist the release of the filter cake from the filter medium.

4. A method in accordance with claim 3 in which the filter medium swingably attached to the tray member and in which the step of conveying the tray member in an inverted position along a second line of travel causes the filter medium to swing about its swingable attachment to the tray member and thereby assist the release of the filter cake from the filter medium.

5. Apparatus for removing filter cake from the filter medium of a stationary filter comprising a porous roller mounted to a frame member, said frame member being adapted to move said porous roller along a predetermined path, said filter to be mounted adjacent said path of movement of said porous roller with a portion of said roller being at a substantially close clearance with said filter medium of said filter, means for rotating said roller with the peripheral movement of said portion of said roller being in the opposite direction as the movement of said roller, an additional filter medium disposed upon said porous roller, means for inducing fluid flow through said additional filter medium into said porous roller, the fluid flow forming an additional filter cake upon said roller from the filter cake on said filter medium, the additional filter cake engaging the filter cake on said filter medium, and a scraper blade disposed adjacent said roller for scraping a layer of filtered material from said roller to retain a uniform layer of additional filter cake thereon and to remove the remainder of filtered material therefrom, whereby the engagement of the additional filter cake on said roller with the filter cake on said filter medium enables the filter cake on said filter medium to be removed.

6. An apparatus in accordance with claim 5 further comprising means for moving said porous roller along said predetermined path.

7. An apparatus in accordance with claim 5 further comprising an additional scraper blade disposed adjacent to the surface of said filter members downstream of said roller, said additional scraper blade extending adjacent to the periphery of said roller and to a substantially close clearance with respect to the surface of said filter members, whereby said additional scraper blade assists in the removal of the filter cake.

8. An apparatus in accordance with claim 5 and further comprising means for pivotally mounting said porous roller and said scraper, means for biasing said mounting means toward said filter medium, and means for engaging said mounting means to limit the clearance between said roller and said filter medium.

9. Method of removing filter cake from the filter medium of a stationary filter comprising moving a porous roller having an additional filter medium disposed thereupon along a predetermined path, mounting and filter adjacent said path of movement of said porous roller with a portion of said roller being at a substantially close clearance with said filter medium of said filter, rotating said roller with said peripheral movement of said portion of said roller being in the opposite direction as the movement of said roller, inducing fluid flow through said additional filter medium into said porous roller, the fluid flow forming an additional filter cake upon said roller from the filter cake on said filter medium, the additional filter cake engaging the filter cake on said filter medium, and scraping a layer of filtered material from said roller to retain a uniform layer of additional filter cake thereon and to remove the remainder of filtered material therefrom, whereby the engagement of the additional filter cake on said roller with the filter cake on said filter medium enables the filter cake on said filter medium to be removed.

10. A method in accordance with claim 9 and further comprising the additional step of scraping the filter cake from the filter medium downstream of the roller and adjacent thereto.

11. A traveling filter comprising a plurality of tray members each having a filter medium disposed thereupon, means for conveying said plurality of tray members along a predetermined path, a plurality of spaced apart frame members each of which has an opening adapted to mate in a facing and sealing relationship with the surface area of said filter medium, means for moving said plurality of frame members along another path extending at least in part adjacent to said predetermined path in order successively to place and remove the opening of each of a portion of said plurality of frame members with respect to a condition of registry and sealing engagement with a different one of said tray members of a corresponding portion of said plurality of tray members, said frame members being adapted to confine a material to be filtered upon said filter mediums when said frame members are placed in registry and sealing engagement with said tray members, removal of said frame members from registry and sealing engagement with said tray members facilitating the removal of filter cakes from said filter media, means for continuously delivering material to be filtered through the openings of said frame members as said frame members are moved along said other path, said material to be delivered to one side of said filter media, means advancing in synchronism with the frame members for directing the continuously delivered material through at least one of the openings of said adjacent frame members as the space therebetween moves adjacent the material delivery means for preventing said material from entering said space, and means for removing filtrate from the opposite side of said filter media thereby forming a filter cake on the one side of said filter media.

12. An apparatus in accordance with claim 11 in which said material directing means comprises a plurality of guard members mounted for movement with said frame members, one guard member being disposed adjacent the space between said adjacent frame members, said guard member adapted for directing the continuously delivered material through at least one of the openings of adjacent frame members as the space therebetween moves adjacent the material delivered means and for preventing said material from entering said space.

13. An apparatus in accordance with claim 12 in which each of said frame members has at least four walls defining the opening, one of the walls of each frame member being parallel to one of the walls of each of said adjacent frame members, and in which each guard member comprises a channel member extending substantially the length of the space between said adjacent frame members with the longitudinal axis thereof substantially parallel to the adjacent walls of said adjacent frame members, the open portion of said channel member extending towards said adjacent frame members for directing said continuously delivered material which impacts said channel member away from said space and through at least one of said openings of adjacent frame members.

14. An apparatus in accordance with claim 13 in which said channel member is a "V"-shaped member.

15. An apparatus in accordance with claim 13 and further comprising a porous roller mounted adjacent said predetermined path and at a substantially close clearance with respect to the surface of said filter mediums of said tray members downstream of said material delivery means, means for rotating said roller with the peripheral movement thereof being in the same direction as the movement of said filter media, an additional filter medium disposed upon said porous roller, means for inducing fluid flow through said additional filter medium into said porous roller, the fluid flow forming an additional filter cake upon said roller from the filter cake on said filter mediums of said members, the additional filter cake engaging the filter cake on said filter mediums of said tray members, and a scraper blade disposed adjacent said roller for scraping a layer of filtered material from said roller to retain a uniform layer of additional filter cake thereon and to remove the remainder of filtered material therefrom, whereby the engagement of the additional filter cake on said roller with the filter cake on said filter members enables the filter cake on said filter mediums of said tray members to be removed.

16. A method of filtering a material to form filter cakes on a filter medium comprising the steps of conveying a plurality of tray members each having a filter medium disposed thereon along a predetermined path having at least a first portion and a second portion, and moving a plurality of frame members each of which has an opening adapted to mate in a facing relationship with the surface area of said filter medium along another path extending at least in part adjacent to said first portion of said predetermined path in order to successively place the opening of each frame member of a portion of said plurality of frame members in a condition of registry and substantial engagement with a different one of said tray members of a corresponding portion of said plurality of tray members adjacent one end of said first portion of said predetermined path and to remove the opening of each of said frame members from said condition of registry and substantial engagement at the other end of said first portion of said predetermined path, the moving of said frame members into a condition of registry and substantial engagement with said frame members enabling said material to be confined upon said filter mediums of said tray members, said filter cakes being adapted to be processed as said filter cakes move along said second portion of said predetermined path.

17. A method of filtering in accordance with claim 16 and further including the step of producing said filter cakes as said filter cakes move along said second portion of said predetermined path.

18. A method in accordance with claim 17 in which said step of processing said filter cakes comprises applying heat to said filter cakes to reduce the moisture content thereof as said filter cakes move along said second portion of said predetermined path.

19. A method of filtering in accordance with claim 16 in which the plurality of tray members are conveyed along a predetermined path which includes upper and lower reaches, said upper reach including said first portion and said second portion of said predetermined path, and in which the plurality of tray members are moved along another path extending at least in part adjacent to said first portion of said predetermined path which includes upper and lower reaches with at least a portion of the lower reach thereof overlying and sufficiently adjacent to said first portion of said upper reach of said conveying means to enable said frame members to be placed in registry and substantial engagement with said tray members.

20. A method of filtering in accordance with claim 18 in which the step of applying heat to said filter cakes includes passing a hot gas across said filter cakes.

21. A traveling filter for filtering a material to form filter cakes on a filter medium comprising a plurality of tray members each having a filter medium disposed thereon, means for conveying said plurality of tray members along a predetermined path having at least a first portion and a second portion, a plurality of tray members each of which has an opening adapted to mate in a facing relationship with the surface area of said filter medium, and means for moving said plurality of frame members along another path extending at least in part adjacent to said first portion of said predetermined path in order successively to place and remove the openings of each frame member of a portion of said plurality of frame members with respect to a condition for registry and substantial engagement with a different one of said tray members of a corresponding portion of said plurality of said tray members, said frame members being adapted to confine said material to be filtered upon said filter mediums when said frame members are placed in a condition of registry and substantial engagement with said filter mediums, said filter cakes being adapted to be processed as said filter cakes move along said second portion of said predetermined path.

22. A traveling filter in accordance with claim 21 further including means for processing said filter cakes as said filter cakes move along said second portion of said predetermined path.

23. A traveling filter in accordance with claim 22 in which said processing means comprises a means for applying heat to said filter cakes to reduce the moisture content thereof as said filter cakes move along said second portion of said predetermined path.

24. A traveling filter in accordance with claim 21 in which said means for conveying said plurality of tray members along a predetermined path includes a path having upper and lower reaches, said upper reach including said first portion and said second portion of said predetermined path, and in which said means for moving said plurality of frame members along another path extending at least in part adjacent to said first portion of said predetermined path includes another path having upper and lower reaches with at least a portion of said lower reach thereof overlying and sufficiently adjacent to said first portion of said upper reach of said conveying means to enable said frame members to be placed in a condition of registry and substantial engagement with said tray members.

25. A traveling filter in accordance with claim 23 in which said means for applying heat to said filter cakes comprises a means for passing a hot gas across said filter cakes.

26. A traveling filter in accordance with claim 22 in which said means for processing said filter cakes comprises a hood assembly mounted above and adjacent said tray members moving along said second portion of said predetermined path, said hood assembly being adapted to confine a processing fluid to be passed across said filter cakes adjacent said filter cakes as they pass beneath the hood assembly.

27. A traveling filter in accordance with claim 26 in which said processing fluid is a hot gas and further including a means for providing hot gas to said hood assembly.

28. A traveling filter in accordance with claim 27 in which said means for providing hot gas to said hood assembly comprising a furnace for heating said gas, a blower adapted to drive said heated gas from said furnace to said hood assembly, and a means for ducting said hot gas from said furnace to said hood assembly.

29. A traveling filter in accordance with claim 22 in which each tray member of said plurality of tray members has structure forming a passage for passing a processing fluid adjacent said filter medium, said structure including a valve means communicatively connected to said passage, and in which said means for processing said filter cakes comprises at least one conduit, one end of said conduit being adapted to be connected to a device for producing a flow of a processing fluid therethrough and the other end of said conduit being adapted to be engaged and disengaged with said valve means, means for driving said conduit along an additional path adjacent to at least a portion of said second portion of said predetermined path, and a means for successively advancing and retracting said conduit with respect to said additional path as said conduit is driven in order to successively engage and disengage said conduit with respect to said valve means of said tray member as said tray member is conveyed along said second portion of said predetermined path, whereby said filter cakes are processed by the flow of the processing fluid through said filter medium and adjacent said filter cake when said conduit engages said valve means of said tray member.

30. A traveling filter in accordance with claim 29 in which said processing fluid is a hot gas for applying heat to said filter cakes.

31. A traveling filter in accordance with claim 29 in which said means for driving said conduit along an additional path adjacent to at least a portion of said predetermined path comprises an endless drive coupled to said conduit and having a portion moving parallel to said predetermined path, said conduit extending at substantially right angles to said predetermined path, and in which said means for successively advancing and retracting said conduit with respect to said additional path comprises means responsive to the movement of said endless drive for successively feeding and withdrawing said conduit along the longitudinal axis thereof with respect to the passage of said tray member.

32. A traveling filter in accordance with claim 29 and further comprising means in circuit with said conduit for controlling the flow of said processing fluid therethrough, said controlling means being responsive to the movement of said conduit along said additional path adjacent to at least a portion of said predetermined path.

33. A traveling filter in accordance with claim 29 in which each of said tray members have structure forming a plurality of said passage for passing a flow of said processing fluid adjacent said filter medium, in which there is a plurality of said conduit adapted to be connected to a device for producing a flow of said processing fluid therethrough, and in which said conduit advancing and retracting means successively engages and disengages said plurality of conduits with respect to said plurality of passages of said tray member as said tray member is conveyed.

34. A traveling filter in accordance with claim 25 in which each tray member of said plurality of tray members has structure forming a passage for inducing a flow of hot gas through said filter cake, said structure including a valve means communicatively connected to said passage, and further comprising at least one conduit, one end of said conduit being adapted to be connected to a device for inducing a flow of a hot gas from said hot gas passing means through said filter cake and the other end of said conduit being adapted to be engaged and disengaged with said valve means, means for driving said conduit along an additional path adjacent to at least a portion of said second portion of said predetermined path, and a means for successively advancing and retracting said conduit with respect to said additional path as said conduit is driven in order to successively engage and disengage said conduit with respect to said valve means of said tray member as said tray member is conveyed along said second portion of said predetermined path, whereby the moisture content of said filter cake is reduced by the flow of the hot gas through said filter cake when said conduit engages said valve means of said tray member.

\* \* \* \* \*